United States Patent
Leontaris et al.

(10) Patent No.: US 12,355,965 B2
(45) Date of Patent: * Jul. 8, 2025

(54) VIDEO COMPRESSION AND TRANSMISSION TECHNIQUES

(71) Applicant: DOLBY LABORATORIES LICENSING CORPORATION, San Francisco, CA (US)

(72) Inventors: Athanasios Leontaris, Burbank, CA (US); Alexandros Tourapis, Burbank, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,917

(22) Filed: May 17, 2024

(65) Prior Publication Data

US 2024/0305783 A1    Sep. 12, 2024

Related U.S. Application Data

(60) Continuation of application No. 17/557,996, filed on Dec. 21, 2021, now Pat. No. 12,041,234, which is a
(Continued)

(51) Int. Cl.
*H04N 19/124* (2014.01)
*H04N 19/137* (2014.01)
(Continued)

(52) U.S. Cl.
CPC ......... *H04N 19/124* (2014.11); *H04N 19/137* (2014.11); *H04N 19/14* (2014.11);
(Continued)

(58) Field of Classification Search
CPC .... H04N 19/124; H04N 19/80; H04N 19/615; H04N 19/137; H04N 19/14; H04N 19/142; H04N 19/15; H04N 19/194
See application file for complete search history.

(56) References Cited

U.S. PATENT DOCUMENTS 6,741,747 B1    5/2004    Burns
6,834,080 B1    12/2004   Furukawa
(Continued)

FOREIGN PATENT DOCUMENTS

EP    1102492 A2    5/2001
JP    H095536 A     1/1997
(Continued)

OTHER PUBLICATIONS

"A New Rate Control Scheme Using Quadratic Rate Distortion Model", IEEE Transactions on Circuits and Systems for Video Technology, vol. 7, No. 1, Feb. 1997, 5 pages.
(Continued)

*Primary Examiner* — On S Mung

(57) ABSTRACT

Embodiments feature families of rate allocation and rate control methods that utilize advanced processing of past and future frame/field picture statistics and are designed to operate with one or more coding passes. At least two method families include: a family of methods for a rate allocation with picture look-ahead; and a family of methods for average bit rate (ABR) control methods. At least two other methods for each method family are described. For the first family of methods, some methods may involve intra rate control. For the second family of methods, some methods may involve high complexity ABR control and/or low complexity ABR control. These and other embodiments can involve any of the following: spatial coding parameter adaptation, coding prediction, complexity processing, complexity estimation, complexity filtering, bit rate consider-
(Continued)

ations, quality considerations, coding parameter allocation, and/or hierarchical prediction structures, among others.

3 Claims, 18 Drawing Sheets

Related U.S. Application Data continuation of application No. 15/718,813, filed on Sep. 28, 2017, now abandoned, which is a continuation of application No. 15/258,109, filed on Sep. 7, 2016, now abandoned, which is a division of application No. 12/206,542, filed on Sep. 8, 2008, now Pat. No. 9,445,110.

(60) Provisional application No. 60/976,381, filed on Sep. 28, 2007.

(51) Int. Cl.

| | | |
|---|---|---|
| H04N 19/14 | (2014.01) | |
| H04N 19/142 | (2014.01) | |
| H04N 19/15 | (2014.01) | |
| H04N 19/154 | (2014.01) | |
| H04N 19/159 | (2014.01) | |
| H04N 19/194 | (2014.01) | |
| H04N 19/615 | (2014.01) | |
| H04N 19/80 | (2014.01) | |
| H04N 19/126 | (2014.01) | |
| H04N 19/149 | (2014.01) | |
| H04N 19/152 | (2014.01) | |
| H04N 19/172 | (2014.01) | |
| H04N 19/174 | (2014.01) | |
| H04N 19/176 | (2014.01) | |
| H04N 19/61 | (2014.01) | |

(52) U.S. Cl.
CPC ............ *H04N 19/142* (2014.11); *H04N 19/15* (2014.11); *H04N 19/154* (2014.11); *H04N 19/159* (2014.11); *H04N 19/194* (2014.11); *H04N 19/615* (2014.11); *H04N 19/80* (2014.11); *H04N 19/126* (2014.11); *H04N 19/149* (2014.11); *H04N 19/152* (2014.11); *H04N 19/172* (2014.11); *H04N 19/174* (2014.11); *H04N 19/176* (2014.11); *H04N 19/61* (2014.11)

(56) References Cited

U.S. PATENT DOCUMENTS

| | | |
|---|---|---|
| 8,594,202 B2 | 11/2013 | Eleftheriadis |
| 8,761,263 B2 | 6/2014 | Eleftheriadis |
| 8,861,613 B2 | 10/2014 | Eleftheriadis |
| 9,077,964 B2 | 7/2015 | Cipolli |
| 9,179,160 B2 | 11/2015 | Cipolli |
| 9,445,110 B2 | 9/2016 | Leontaris |
| 2003/0235220 A1 | 12/2003 | Wu |
| 2004/0252758 A1 | 12/2004 | Katsavounidis |
| 2005/0053135 A1 | 3/2005 | Haskell |
| 2005/0105815 A1 | 5/2005 | Zhang |
| 2005/0169379 A1 | 8/2005 | Shin |
| 2005/0175093 A1 | 8/2005 | Haskell |
| 2006/0013307 A1 | 1/2006 | Olivier |
| 2006/0233237 A1 | 10/2006 | Lu |
| 2007/0019724 A1 | 1/2007 | Tourapis |
| 2007/0263720 A1 | 11/2007 | He |
| 2007/0291841 A1 | 12/2007 | Muraki |
| 2008/0063052 A1 | 3/2008 | Lin |
| 2008/0259799 A1 | 10/2008 | Van Beek |
| 2009/0086816 A1 | 4/2009 | Leontaris |
| 2017/0034513 A1 | 2/2017 | Leontaris |
| 2018/0020220 A1 | 1/2018 | Leontaris |

FOREIGN PATENT DOCUMENTS

| | | |
|---|---|---|
| JP | H09331531 A | 12/1997 |
| JP | H11215501 A | 8/1999 |
| JP | 2001204022 A | 7/2001 |
| JP | 2003204554 A | 7/2003 |
| JP | 2004266640 A | 9/2004 |
| WO | 2005022923 W | 3/2005 |
| WO | 2006004605 W | 1/2006 |
| WO | 2007117711 W | 10/2007 |

OTHER PUBLICATIONS

"Advanced Video Coding for Generic Audiovisual Services", Series H: Audiovisual and Multimedia Systems, Infrastructure of Audiovisual Services—Coding of Moving Video, ITU-T Recommendation H.264 (May 2003), Mar. 2003, 282 pages.
"SMPTE Standard: VC-1 Compressed Video Bitstream Format and Decoding Process", SMPTE 421M-2006, Annroved 24-Febmarv-2006, Apr. 2006, 493 pages.
"Transmission of Non-Telephone Signals", Information Technology—Generic Coding of Moving Pictures and Associated Audio Information: Video, ITU-T Recommendation H.262 (1995 E), Nov. 1994, 211 pages.
Andrew B. Watson, "Perceptual Optimization of DCT Color Quantization Matrices", MS 262-2 NASA Ames Research Center, Moffett Field CA 94035-1000, Nov. 1994, 5 pages.
Athanasios Leontaris et al., "Rate Control Reorganization in the Joint Model (JM) Reference Software", Video Standards and Drafts, XX, XX, No. JVT-WO42, Apr. 27, 2007, (Apr. 27, 2007), XP030007002, pp. 5-6, paragraph 3.3.
Chinese Notification of the First Office Action (with English translation) for Application No. CN 200880115861.7 dated Jan. 18, 2012, 9 pages. (23156-0002CN1).
Chinese Office Action issued in CN 200880115861.7 on Jun. 20, 2013, with English Translation, 15 pages.
Chinese Office Action issued in CN 200880115861.7 on Mar. 3, 2014, with English Translation, 11 pages.
Chinese Office Action issued in CN 200880115861.7, dated Nov. 29, 2012, 7 pages (with Machine Translation).
EP Search Report and Written Opinion in European Appln. No. 10166423, dated Aug. 5, 2010, 9 pages.
International Telecommunication Union-ITU-T, H.264 Amendment 2, "Series H: Audiovisual and Multimedia Systems" Apr. 2007, 75 pages.
Japanese Office Action issued in JP2010-527008 on Dec. 10, 2012, English Translation, 5 pages.
Kannan Ramchandran and Martin Vetterli, "Rate-Distortion Optimal Fast Tresholding with Complete JPEG/MPEG Decoder Compatibility", IEEE Transactions on Image Processing, vol. 3, No. 5, Sep. 1994, Sep. 1994, 5 pages.
Loren Merritt and Rahul V anam, "X264: A High Performance H.264/ A VC Encoder", Dept. of Electrical Engineering, University of Washington, Seattle, WA 98195-2500, Apr. 2007, 13 pages.
M. Mahdi Ghandi and Mohammed Ghanbari, "A Lagrangian Optimized Rate Control Algorithm for the H.264/AVC Encoder", Department of Electronic Systems Engineering, University of Essex, Wivenhoe Park, Colchester CO4 3SQ, UK, Oct. 2004, 4 pages.
PCT International Preliminary Report on Patentability in International Appln. No. PCT/US08/75605, dated Mar. 30, 2010, 19 pages.
PCT International Search Report and Written Opinion of the International Searching Authority issued on Mar. 4, 2009, in co-pending application No. PCT/US2008/075605.
Summons to attend oral proceedings pursuant to Rule 115(1) EPC issued in EP10166423.3-1918/2227020 on Jun. 12, 2013, 5 pages.
Zhihai He, Yong Kwan Kim, and Sanjit K. Mitra, "Low-Delay Rate Control for DCT Video Coding Via p-Domain Source Modeling", Aug. 2001, 13 pages.

VIDEO COMPRESSION AND TRANSMISSION TECHNIQUES

CROSS REFERENCE TO RELATED APPLICATIONS

This application is a continuation of U.S. patent application Ser. No. 17/557,996, filed Dec. 21, 2021, which is a continuation of U.S. patent application Ser. No. 15/718,813, filed Sep. 28, 2017, now abandoned, which is a continuation of U.S. patent application Ser. No. 15/258,109, filed Sep. 7, 2016, now abandoned, which is a division of U.S. patent application Ser. No. 12/206,542, filed Sep. 8, 2008 (now U.S. Pat. No. 9,445,110), which claims the benefit of priority to U.S. Provisional Application No. 60/976,381, filed Sep. 28, 2007. The entire disclosure of each of the foregoing applications is incorporated by reference.

TECHNICAL FIELD

The present disclosure relates to rate allocation, rate control, and/or complexity for video data, such as for video data for video compression, storage, and/or transmission systems.

BACKGROUND

Rate allocation and rate control are integral components of modern video compression systems. Rate allocation is the function by which a bit target is allocated for coding a picture. Rate control is a mechanism by which the bit target is achieved during coding the picture.

A compressed bit stream may be able to satisfy specific bandwidth constraints that are imposed by the transmission or targeted medium through rate control. Rate control algorithms can try to vary the number of bits allocated to each picture so that the target bit rate is achieved while maintaining, usually, good visual quality. The pictures in a compressed video bit stream can be encoded in a variety of arrangements. For example, coding types can include intra-predicted, inter-predicted, and bi-predicted slices.

SUMMARY

These and other embodiments can optionally include one or more of the following features. In general, implementations of the subject matter described in this disclosure feature a method for estimating a complexity of a picture that includes receiving a metric of a complexity of a picture generated from a motion-compensated processor or analyzer, a motion compensator, a spatial processor, a filter, or from a result generated from a previous coding pass. The complexity includes a temporal, a spatial, or a luminance characteristic. The method involves estimating the metric of the complexity of the picture by determining if the picture is correlated with a future or past picture; and determining if the picture or an area of the picture masks artifacts more effectively than areas of the picture or the future or past picture that do not mask the artifacts. Some implementations of the method may use coding statistics (and/or other characteristics of the picture) to compare the masking of artifacts in the area of the picture with at least one other area of the picture, at least one other area of a past picture, or at least one other area of a future picture, or use coding statistics to compare masking artifacts in the picture with a past picture or a future picture, and then estimate the metric for the complexity using the coding statistics. These and other implementations of these features are in corresponding apparatuses, systems, and/or computer program products, encoded on a computer-readable medium, operable to cause data processing apparatuses to perform operations for estimating the complexity of the picture.

In general, other aspects of the subject matter described in this disclosure include implementations for a method for generating high quality coded video. The method involves assessing complexity information between video pictures, where the complexity information includes temporal, spatial, or luminance information, and the video pictures include video frames. The method includes using the complexity information to determine a frame type and to analyze parameters. The parameters include parameters for scene changes, fade-ins, fade-outs, cross fades, local illumination changes, camera pan, or camera zoom. The method also includes filtering an amount of statistics and/or complexity between the video frames by using the analyzed parameters to remove outliers and/or avoid abrupt fluctuations in coding parameters and/or video quality between the video frames. These and other implementations of these features are in corresponding apparatuses, systems, and/or computer program products, encoded on a computer-readable medium, operable to cause data processing apparatuses to perform operations for generating high quality coded video.

In general, other aspects of the subject matter described in this disclosure include implementations for a method for estimating complexity for pictures. The method involves determining if the pictures are to be coded in a hierarchical structure. The hierarchical structure includes multiple picture levels, and bits or coding parameters at different picture levels. Upon the determination that a picture is assigned to a certain hierarchical level, the method includes coding a picture based on an importance of the picture. The coding includes controlling a quality level of the picture, and varying at least one of the coding parameters of the picture based on the importance. These and other implementations of these features are in corresponding apparatuses, systems, and/or computer program products, encoded on a computer-readable medium, operable to cause data processing apparatuses to perform operations for estimating complexity for the pictures.

In general, other aspects of the subject matter described in this disclosure include implementations for a method for coding video data. The method involves coding parameters for the video data on a macroblock basis, where the coding involves accounting for variations in spatial and temporal statistics. The method includes generating a complexity measure, determining an importance of the complexity measure, mapping the complexity measure to a coding parameter set, and using the complexity measure to adjust the coding parameter set to improve/increase a level of quality to the video data by making an image region in the video data more or less important in the video data. These and other implementations of these features are in corresponding apparatuses, systems, and/or computer program products, encoded on a computer-readable medium, operable to cause data processing apparatuses to perform operations associated with video processing.

In general, other aspects of the subject matter described in this disclosure include implementations for encoding a picture. The method involves receiving a current frame, setting a bit rate target and a number of bits for the current frame, and determining complexities for the picture. The determination of the complexities includes determining, in parallel, coding parameters for respective complexities. The determination of the complexities also include, after the coding parameters are determined for respective complexities, coding respective pictures using the respective complexities, selecting a final coded picture from the coded respective pictures, and updating the complexities using the final coded picture selection. These and other implementations of these features are in corresponding apparatuses, systems, and/or computer program products, encoded on a computer-readable medium, operable to cause data processing apparatuses to perform operations associated with video processing.

In general, other aspects of the subject matter described in this disclosure include implementations for a method for rate allocation for video. The method involves receiving information for a picture look-ahead buffer, and in a first coding pass, performing rate allocation to set a bit target for a picture. The rate allocation involves utilizing the picture look-ahead buffer to determine a complexity for the picture, and selecting a coding parameter set for the bit target using a rate control model. These and other implementations of these features are in corresponding apparatuses, systems, and/or computer program products, encoded on a computer-readable medium, operable to cause data processing apparatuses to perform operations associated with video processing.

In general, other aspects of the subject matter described in this disclosure include implementations for a method for rate allocation for video coding. The method involves initializing a quantization parameter and a number of remaining bits for a picture, and determining a total complexity for picture look-ahead frames. The method also involves determining a slice type for the picture comprising an I-coded picture, a P-coded picture, or a periodic I-coded picture. The determination of the slice type involves, for the I-coded picture, determining a number of bits allocated to an inter-coded picture, and employing a first rate control model to use the quantization parameter to code the picture; for the P-coded frame, determining a number of bits allocated to a predictive coded picture, and employing a second rate control model using the quantization parameter to code the picture; and for the periodic I-coded picture, using a previous quantization parameter to code the picture. After the slice type is determined, the method includes coding a picture for the determined slice type. These and other implementations of these features are in corresponding apparatuses, systems, and/or computer program products, encoded on a computer-readable medium, operable to cause data processing apparatuses to perform operations associated with video processing.

In general, other aspects of the subject matter described in this disclosure include implementations for a method for video coding. The method involves receiving coding statistics for previous pictures in a video system, and receiving look-ahead information for future pictures. The method includes using a coding parameter set to code a current picture, where the coding parameter set includes coding parameters. The coding parameters include a base coding parameter set and a modifier to achieve a target bit rate for the previous pictures and the current picture. The current and previous pictures include weights to adjust picture quality and bit rate allocation. The method also involves adjusting the weights to modify the picture quality of the current and previous pictures. The picture quality is dependent on a rate factor for the quantization parameter, and the adjustment of the weights modifies the bit rate allocation. These and other implementations of these features are in corresponding apparatuses, systems, and/or computer program products, encoded on a computer-readable medium, operable to cause data processing apparatuses to perform operations associated with video processing.

In general, other aspects of the subject matter described in this disclosure include implementations for a method for rate control. The method involves initializing values for a set of coding parameters and a rate factor, determining a bit target, a number of bits used, and a coding parameter modifier, and determining the rate factor with the bit target. The method further involves determining a slice type from a level-greater-than-zero frame, a predicted coded frame at level zero, an intra coded frame at level zero, and a periodic intra coded frame at level zero. The method also includes selecting the determined slice type. These and other implementations of these features are in corresponding apparatuses, systems, and/or computer program products, encoded on a computer-readable medium, operable to cause data processing apparatuses to perform operations associated with video processing.

The present disclosure describes techniques and systems for rate control and rate allocation. In one aspect, this disclosure presents novel single and multiple-pass algorithms for rate allocation and rate control for video encoding. The proposed rate control algorithms can be designed to take advantage of look-ahead information and/or past information to perform rate allocation and rate control. This information can be passed to the rate control algorithms either through some lightweight or downgraded version of the encoder, previous coding passes, by down-sampling the original signal and processing it at a lower resolution, or through the use of a motion-compensated pre-analyzer that computes various statistics relating to the input signal, or combinations thereof. The described rate control algorithms can be further enhanced by advanced estimation and filtering of scene and picture statistics. The estimation and filtering of statistics can use information from both future and past pictures.

As used herein, the terms "slice", "picture", and "frame" can be used interchangeably. A picture may be, for example, in a frame or field coding mode, and may be coded using multiple slices, which can be of any type, or as a single slice. In general, all techniques and methods discussed herein can also be applied on individual slices, even in cases where a picture has been coded with multiple slices of different types. In most aspects, a picture can be a generic term that could define either a frame or a field. Fields can refer to "interlace type" pictures, while two opposite parity fields (e.g., top and bottom fields) can constitute a frame (in this scenario though the frame has odd and even lines coming from different intervals in time). Even though this disclosure primarily discusses frames or frame pictures, the same techniques could apply on field (e.g., top or bottom) pictures as well.

The term "algorithm" can refer to steps, methods, processes, schemes, procedures, operations, programs, guidelines, techniques, sequences, and/or a set of rules or instructions. For example, an algorithm can be a set of video processing instructions for a hardware and/or software video processor. The algorithms may be stored, generated, and processed by one or more computing devices and/or machines (e.g., without human interaction). The disclosed algorithms can be related to video and can be generated, implemented, associated, and/or employed in video-related systems and/or any devices, machines, hardware, and/or articles of manufacture for the processing, compression, storage, transmission, reception, testing, calibration, display, and/or any improvement, in any combination, for video data.

In some aspects, the present disclosure addresses how to efficiently allocate bits for particular video sequences. This can be done by addressing how the number of bits required for each picture can be computed, and to make sure that this picture is going to be coded in such a way that it is going to achieve its bit target.

In some implementations, an algorithm can generate a bit target by taking advantage of some look-ahead feature such it has some advanced information of the complexity of future pictures and uses this information to ultimately allocate bits within pictures, including entire pictures. When there are no delay constraints, there can be a look-ahead window that can move in front of the picture and information can be obtained about N future pictures. Also, the disclosed scheme can use bit targets in an iterative fashion by taking results from a previous coding session in order to achieve a target bit number. The look-ahead window can use inputs from a motion-compensated pre-filter or a previous coding session. In a different embodiment for a transcoding aspect, the video input may have been a previously encoded video, using a variety of possible encoding schemes, and the look-ahead window can use inputs directly from this bit stream.

Parts of this disclosure describe one or more families of rate allocation and rate control algorithms that can benefit from advanced processing of past and future frame/field picture statistics and can be designed to operate either with a single or multiple coding passes. These schemes can also consider and benefit from a picture look-ahead, which may impose some coding delay into the system.

In general, at least two algorithm families are introduced and described: (a) a family of algorithms/processes for a rate allocation with look-ahead; and (b) a family of algorithms/ processes for average bit rate (ABR) control algorithms, which also benefit from look-ahead but are not as dependent on it as algorithms in (a). At least two algorithms of each algorithm family are described herein. For the first family of algorithms, the two algorithms disclosed differ on intra rate control, among other things. For the second family of algorithms, two algorithms are disclosed for high complexity ABR control and low complexity ABR control, respectively. These latter two algorithms differ at least with respect to the rate factor determination, among other things.

Several algorithms are described, where the algorithms can depend on some measure of picture complexity. The picture complexity estimate is then described along with advanced methods for complexity processing and filtering. Also, the coding parameter, such as Quantizers (QP), lagrangian multipliers, thresholding and quantization rounding offsets, and rate allocation for hierarchical pictures can be further enhanced through comprehensive consideration of sequence statistics. Also, algorithms are described that can vary the visual quality/allocated bit rate within the pictures for added compression gain.

A first algorithm in a first family is a novel rate allocation algorithm that can be dependent on having access to statistics and complexity measures of future pictures. The first algorithm in the first family (see e.g., section on rate allocation with look ahead—algorithm 1) can yield the bit target for each picture. This algorithm does not have to select the coding parameters (e.g., QP, lagrangian multipliers) that will be used to code the picture. This selection can be the task of an underlying arbitrary rate control model, which takes the bit target as the input and yields the coding parameters. Algorithms that can be used for this arbitrary rate control model can include the quadratic model and the rho-domain rate control model, among others. In general, this algorithm could use any rate control as long as the rate control translates the bit target into a corresponding set of coding parameters.

In some implementations, the algorithms in the first family may not use a rate control, but can determine the number of bits per picture and, afterwards, any rate control algorithm can be used to map bits to coding parameters, such as QP values. The coding parameters can be fitted to achieve the desired bit rate target. Aspects of this algorithm can use a look-ahead window and/or the complexity of past pictures to make a determination as to how many bits should be assigned to each picture. Further, the number of bits for a picture can be adjusted based on how other pictures were coded or are expected to be coded (e.g., a consideration cam be made on the future impact on a picture when selecting how to encode the picture). The second algorithm in this family differs from the first mainly in the consideration of intra-coded pictures.

Algorithms of the second family (see e.g., sections on high-complexity and low complexity ABR rate control with look ahead) can be less dependent on future pictures (e.g., look ahead) compared to the first algorithm, and can employ complex processing on previous pictures statistics. These algorithms can perform both rate allocation and rate control. A bit target is not set for each picture. Instead, these algorithms attempt to achieve the average target bit rate for all pictures coded so far, including the current picture. They can employ complexity estimates that include information from the future. Aspects of these algorithms can take into account frames that are not being predicted from other frames. These algorithms can be characterized as average bit rate (ABR) rate control algorithms.

The second algorithm of the second family (see e.g., sections on high-complexity and low complexity ABR rate control with look ahead) can share many of the similarities with the first algorithm of this family and, in some implementations, can have the advantage of very low computational complexity. Both algorithms can perform both rate allocation and rate control, and can benefit from both future and previous pictures information.

While the algorithms in the first family of algorithms can achieve a global target by adjusting locally how many bits will be allocated, the algorithms of the second family can achieve a global target without having to explicitly specify a number of bits for a picture. These algorithms can work to "smooth" the quality between pictures to avoid undesired artifacts in pictures. These algorithms can allocate coding parameters to achieve the total bit rate targets without having to necessarily achieve the exact bit target for every picture. Hence, the algorithms of the second family are less granular in the bit domain than the first family of algorithms. In other words, the first family of algorithms can operate more in the bit domain (e.g., concerned with bit rate), and the algorithms of the second family can operate more in the quality domain (e.g., concerned with distortion).

The algorithms of the second family can obtain target bit rates by using the statistics from previous coded pictures, but some algorithms of the second family can have higher complexity in some implementations (see e.g., section for high-complexity ABR rate control with look-ahead). In some implementations, the algorithms of the second family can have some similarities, such as how QP values are used. The look-ahead for some of these algorithms can be down to zero, and statistics from the past can be used to predict the future. The past information can be from the beginning from the sequence or from a constrained window using a number of pictures from the sequence.

Some algorithms of the second family can also have a rate factor, $f_{curr}$, that can be used to divide the complexity of a current picture to yield a quantization parameter. A method used to determine the complexity and its relationship with the rate factor can offer additional enhancements in terms of compression efficiency. Further, different amounts of quality can be allocated for different parts of an image sequence.

Also described are novel complexity estimation algorithms that can improve estimation by incorporating temporal, spatial, and luminance information (see e.g., section on complexity estimation).

Further, novel algorithms are described for complexity estimation in the case of hierarchical pictures (see e.g., section on coding parameter allocation for hierarchical prediction structures). These complexity estimation algorithms can benefit all of the described rate control algorithms, as well as other existing and future rate control algorithms. In one example, an algorithm is presented for efficient coding parameter allocation for the case of hierarchical pictures. A discussion is provided on how to allocate the bits or adjust coding parameters (e.g., QPs) between hierarchical levels and how to determine dependencies. In this aspect, a determination can be made on how to determine coding of a picture based on the importance of the picture. This can provide a benefit of conserving a number of bits or improving quality. The quality and/or bit rate can be controlled not only by varying quantizers, but also by varying other parameters, such as the use and prioritization of specific coding modes and/or tools, such as weighted prediction and direct mode types, the lagrangian parameters for motion estimation and mode decision, transform/quantization thresholding and adaptive rounding parameters, and frame skipping, among others.

The allocation can be performed at different levels. For example, the coding parameters (e.g., QP) can be changed for different and/or smaller units. For instance, a segmentation process could be considered that would separate a scene into different regions. These regions could be non-overlapping, as is the case on most existing codecs, but could also overlap, which may be useful if overlapped block motion compensation techniques are considered. Some regions can be simpler to encode, while others can be more complicated and could require more bits. At the same time, different regions can be more important subjectively or in terms of their coding impact for future regions and/or pictures.

The complexity measures that are estimated above can be filtered and configured to the source content statistics. Filtering can include past and future pictures and also can be designed to work synergistically with all other algorithms presented in this disclosure.

In some implementations, complexity can be determined with multiple or parallel schemes. Complexity could be determined using a variety of objective or subjective distortion metrics, such as the Summed Absolute Difference (SAD), the Mean Squared Error (MSE), the Video Quality Index (VQI) and others. As an example, these different distortion metrics can be determined and used in parallel to provide different bit allocation and/or rate control and can result in additional degree of freedom for selecting the appropriate coding parameters for encoding a picture or region, or to enhance the confidence for a given parameter or set of parameters. More specifically, if all or most complexity metrics result in the same coding parameters, then our confidence in using this set of parameters can be increased. These complexity metrics could also be considered in parallel to encode a picture or region multiple times with each distinct coding parameter set. A process can follow that would determine which coding parameter set should be selected for the final encoding of this picture/region. As an example, the coding parameter set that best achieves the target bit rate with also the highest quality is considered. In a different example, the coding parameter set resulting in the best joint rate distortion performance is selected instead. This information could also be stored for subsequent encoding passes.

In some implementations, compression performance can depend on selecting the most suitable coding parameters, e.g., quantization parameters, for each picture. This performance can be further improved by efficiently distributing these coding parameters within the picture itself. Certain areas of a picture can be more sensitive to compression artifacts and vice versa. This issue is therefore addressed in parts of this disclosure.

In some implementations, noise can be filtered and smoothed out in pictures and along sequences of pictures. In terms of complexity, the coding quality can be improved between frames by looking at the information of other frames to reduce visible coding differences. Different frame types are analyzed and parameters are provided for certain scene types, such as scene changes, fade-ins/fade-outs for global illumination changes, cross fades for fade transitions that connect two consecutive scenes, local illumination changes for parts of a picture, and camera pan/zoom for global camera motion, among others (see e.g., section for complexity filtering and quality bit rate considerations).

A discussion is also provided on coding parameters on a macroblock (MB) basis to account for variations in spatial and temporal statistics (see e.g., section on spatial coding parameter adaptation). Different complexity measures, including temporal complexity measures (e.g., SAD, motion vectors, weights, etc.), spatial measures (e.g., edge information, luminance and chrominance characteristics, and texture information) can be generated. These could then be used in a process to determine the importance of the measures and to generate and map a complexity to a particular coding parameter (e.g., quantization parameter value), which will then be used to code an image region according to a desired image quality or target bit rate. In particular, the result can serve as an additional parameter to add more quality to a particular region to make that region more important or less important. This result can provide a localized adjustment based on what is perceived as important.

The various steps of an example rate control algorithm are disclosed herein. In some implementations, a system for this rate control can include a video encoder, an optional motion-estimation and compensation pre-analyzer, optional spatial statistics analysis modules, one or multiple rate control modules that select the coding parameters, multiple statistics module that gathers useful statistics from the encoding process, an optional statistics module that gathers statistics from the motion-estimation and compensation (MEMC) pre-analyzer, and decision modules that fuse statistics from the optional MEMC pre-analyzer, and the video encoder, and control the rate allocation and control modules. In an implementation for a transcoder, statistics can be derived directly from the bit stream that can be re-encoded using the disclosed techniques.

These algorithms and complexity estimations are not limited to a particular coding standard, but can be used outside or in addition to a coding standard. Also, coding dependencies can be investigated between coding schemes in a video coding system to improve coding performance.

The techniques that are described in this patent application are not only applicable to the two families of rate control algorithms described herein, but also on other existing rate control algorithms as well as future variations of them. In some implementations of transcoding, for example, complexity enhancements can be provided using the disclosed techniques because statistics already available in the bit stream could be used "as is" from the disclosed methods to result in accurate bit allocation and/or enhanced quality.

The term "image feature" may refer to one or more picture elements (e.g., one or more pixels) within a field. The term "source field" may refer to a field from which information relating to an image feature may be determined or derived. The term "intermediate field" may refer to a field, which may temporally follow or lead a source field in a video sequence, in which information relating to an image feature may be described with reference to the source field. The term "disparity estimation" may refer to techniques for computing motion vectors or other parametric values with which motion, e.g., between two or more fields of a video sequence, or other differences between an image, region of an image, block, or pixel and a prediction signal may efficiently be predicted, modeled or described. An example of disparity estimation can be motion estimation. The term "disparity estimate" may refer to a motion vector or another estimated parametric prediction related value. The term "disparity compensation" may refer to techniques with which a motion estimate or another parameter may be used to compute a spatial shift in the location of an image feature in a source field to describe the motion or some parameter of the image feature in one or more intermediate fields of a video sequence. An example of disparity compensation can be motion compensation.

The above terms may also be used in conjunction with other video coding concepts (e.g., intra prediction and illumination compensation).

Any of the methods and techniques described herein can also be implemented in a system with one or more components, an apparatus or device, a machine, a computer program product, in software, in hardware, or in any combination thereof. For example, the computer program product can be tangibly encoded on a computer-readable medium, and can include instructions to cause a data processing apparatus (e.g., a data processor) to perform one or more operations for any of the methods described herein.

Details of one or more implementations are set forth in the accompanying drawings and the description herein. Other features, aspects, and enhancements will be apparent from the description, the drawings, and the claims.

DESCRIPTION OF THE DRAWINGS

Like reference numbers and designations in the various drawings can indicate like elements.

DETAILED DESCRIPTION

Figure 1:
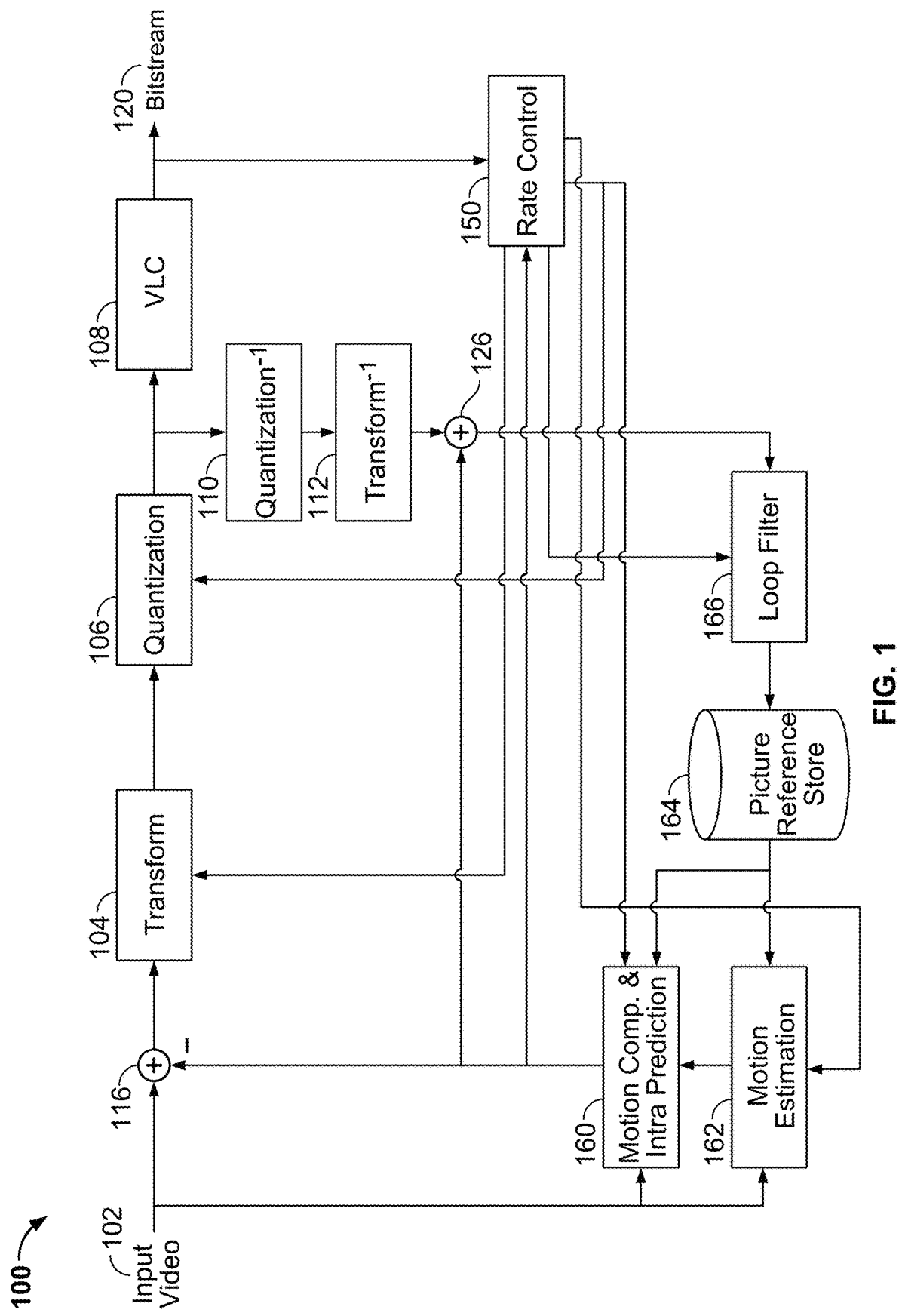
FIG. 1 depicts an implementation of an example of a rate control scheme within a video encoder.

The general structure and techniques, and more specific embodiments which can be used to effect different ways of carrying out the more general goals, are described herein.

As used herein, the terms I_SLICE, P_SLICE, and B_SLICE can refer to I-coded, P-coded, and B-coded pictures, respectively. The same concepts here could also be extended for pictures that are encoded using multiple slices of the same or different type. Periodic intra pictures (I_SLICE) can refer to pictures that are forced to be coded as I_SLICE in order to improve random access and error resilience in the image sequence. For the case of H.264/AVC, the I-coded picture can be signaled as an IDR (instantaneous decoding refresh) picture to enable true random access. Alternatively, the picture may be signaled as non-IDR, and measures may be taken to avoid referencing pictures coded prior the I-coded picture from future, in coding order, pictures. The disclosed rate control algorithms can account for periodic intra-coded pictures.

The goals of achieving a target bit rate, such as maintaining good visual quality, and satisfying specific bandwidth constraints imposed by the transmission or targeted medium, can be competing goals that lead to a challenging optimization problem. Some objectives of a video compression system include achieving high compression performance, e.g., to achieve the lowest possible subjective and/or objective distortion (e.g., Peak Signal-to-Noise Ratio, Mean Squared Error, etc) given a fixed target number of bits for the compressed bit stream, and/or achieving the highest compression given a certain target quality. Video encoders produce a compressed bit stream that, once decoded by a compliant decoder, can yield a reconstructed video sequence that can be displayed, optionally processed, and viewed at the receiver side.

Storage and/or transmission mediums can send this bit stream to the receiver to be decoded in a variety of ways. Each one of these transport modes can have different delay and bandwidth requirements, such as the following requirements.

The bit stream can be stored and transported on an optical or magnetic disk, or on non-volatile computer memory, where each type of memory has its own bandwidth limitations. The bandwidth limitations can allow for a certain amount of delay.

The user can download the bit stream from some remote server on the Internet and view the reconstructed video off-line at a later time with a delay similar to the above mentioned situation with the storage and transportation of the bit stream on memory.

The user can stream the bit stream from a remote internet server, where the network constrains the bandwidth. The user can view the video stream with a small time delay on a client computer or device.

The bit stream can be the result of either real-time interactive video communication, such as video-conferencing, or a live-event video stream, such as for sports or news.

In some implementations, real-time communication can entail very low end-to-end delays in order to provide a satisfying quality of service. Live-event streaming can involve slightly higher end-to-end delays than real-time communication. Optical and magnetic disk storage and movie downloads can tolerate much greater delays since decoding and display on a computer can benefit from a lot of buffering space. Internet streaming of movies or TV shows can allow for additional delay when compared to live-event streaming. End-to-end delay can be a function of the communication channel and the video coding process. Modern video coders can buffer future pictures prior to coding the current picture to improve compression performance. Buffering may involve increased transmission and playback delay.

The capacity of the data pipe can also vary for each transport medium. Optical and magnetic disk storage can be very generous in terms of bandwidth. High-capacity storage mediums such as Blu-Ray or HD-DVD disks can have an upper limit on both bit capacity and decoder buffer size. Off-line playback may not be constrained in terms of bandwidth since the bit stream can be viewed offline; however, practical limitations relating to hardware limitations, buffering delay, and hard drive storage space can exist. Internet streaming and real-time interactive video communication can be constrained by the bandwidth of the networks used to transport the bit streams. In some cases, bit streams that have been generated for one transport medium may not be suitable for transmission through a different transport medium. For example, a bit stream that is stored on an optical disk (e.g., DVD) will likely have been compressed at a high bit rate such as 5 Mbps. The end-user experience may be degraded if this bit stream is streamed online over a network with inadequate bandwidth.

FIG. 1 shows an example implementation of a rate control scheme 100 within a video encoder. The mechanism of rate control can generate compressed bit streams that satisfy the bandwidth, delay, and quality constraints of the video system. Rate control can ensure that the bit rate target is met, and that the decoder input buffer will not be overflowed or starved. Optionally, the rate control also can try to achieve the lowest possible distortion for the given bit rate target and delay/buffering constraints.

In FIG. 1, the input video 102 is sent to an adder 116 that sums the input video 102 with an output of a motion compensation and intra-prediction block 160. The output from the adder 116 is coupled to a transform block 104, followed by a quantization block 106. The quantization block 106 and the transform block 104 also receive an input from the rate control 150. The transform block 104 can be instructed by the rate control block 150 to perform one of the following tasks: (a) adjust the transform matrices; (b) adjust or selectively zero out (threshold) certain transformed coefficient samples, among others. The output of the quantization block 106 is coupled to a VLC block 108 and an inverse quantization block 110. The bit stream 120 results from the VLC block 108 and information about the encoding process, such as the number of bits required to encode a block, region, or image, and the distortion introduced by such decision, are sent to the rate control 150.

The rate control also receives an input from the motion compensation and intra-prediction block 160, and has an output to the motion compensation and intra-prediction block 160, the motion estimation block 162, the transform block 104, the loop filter 166, and the quantization block 106. The motion compensation and intra-prediction block 160 can be instructed by the rate control block 150 to perform one of the following tasks: (a) selectively enable and disable intra prediction modes; (b) select a particular coding mode (e.g., skip mode), among others. The motion estimation block 162 can be instructed by the rate control block 150 to perform one of the following tasks: (a) selectively enable and disable motion-compensation block-sizes; (b) use certain frames as motion-compensation references; (c) adjust the motion estimation search range and the number of iterations in joint bi-predictive motion estimation, among others. The loop filter block 166 can be instructed by the rate control block 150 to perform one of the following tasks: (a) adjust the parameters of the in-loop deblocking filter; (b) switch-off the deblocking filter, among others.

The inverse transform block 112 receives an input from the inverse quantization block 110 and sends an output to an adder 126. The adder 126 receives the signal from the inverse transform block 112 and the motion compensation and intra-prediction block 160, and sends a summed signal to a loop filter 166. A picture reference store 164 receives an input from the loop filter 166, and sends an output to the motion compensation and intra-prediction block 160 and the motion estimation block 162. The motion estimation block 162 also receives an input from the rate control 150. The loop filter 166 also receives an input from the rate control 150. The input video 102 is also sent to an input of the motion compensation and intra-prediction block 160 and the motion estimation block 162.

A compliant bit stream can be configured to satisfy at least two constraints with respect to the decoder buffer: the received picture bits can fit in the buffer (otherwise, there is a buffer overflow); and when the decoder removes a picture from the buffer so that decoder can decode the picture, the picture can be received in its entirety (otherwise, this would result in buffer underflow—a starvation). There can be a number of ways with which the number of bits allocated to a picture may be affected. The number of spent bits can be controlled by varying the coding parameters. More specifically, rate control can be applied by varying the quantization parameter that is used to quantize the residual transform coefficients of the block, or by selecting a coding mode that trades-off visual quality for transmitting fewer bits, such as signaling that the entire block should be skipped and a previous one should be copied and displayed in its place. Rate control can also be applied by varying a Lagrangian lambda parameter that is used during Lagrangian rate-distortion optimization of the motion estimation and coding mode decision. Rate control can also be accomplished by thresholding (zeroing-out) the discrete cosine transform coefficients (DCT), among others, or by choosing not to code certain pictures and instead signal that those pictures should be skipped so that previously coded pictures are displayed in their place (e.g. frame skipping).

Rate allocation and rate control can be accomplished by varying the quantization parameter value since this value can have a more direct relationship to both quality/distortion and the bit usage when compared to other methods. Some objectives of rate control can be to achieve the bit rate target, satisfy the encoder and decoder buffer constraints, and, optionally, achieve low visual distortion for the compressed image sequence. Furthermore, the objectives may have to be accomplished with a fixed budget for computational and memory complexity. The selection of the quantization parameter might employ a simple or a more comprehensive algorithm.

A simple rate control algorithm, for example, may involve the following procedure. The first picture in the video sequence can be encoded with some predetermined quantization parameter value. The encoder can then compare the resulting number of bits with the original bit target. If the resulting number of bits exceeds the bit target, then the quantization parameter for the next picture can be incremented to reduce the bit usage. If, on the other hand, the resulting bits are less than the bit target, the quantization parameter value for the next picture can be decremented to increase the bit usage. At the limit, the above described heuristic algorithm can attain, more or less, the target bit rate. However, the video quality may suffer greatly due, in part, to the simplicity of the algorithm.

Rate control algorithms may attain their performance through a variety of coding tools. A block in the current picture can be predicted as a motion-compensated block from a previously decoded picture (inter prediction). In some other coding arrangements, a pixel in the current picture may be predicted using information from the same picture (intra prediction). These techniques can be referred to as coding modes. An error between the current picture and the prediction (inter or intra) can be determined using different distortion metrics. Commonly, the Mean Squared Error (MSE), or equivalently, the Summed Squared Error (SSE), and the Mean Absolute Difference (MAD), or equivalently, the Summed Absolute Difference (SAD) of the (intra or inter) prediction error can be employed. The SAD error can be an indicator of the difficulty in encoding a block since a high SAD error can be the result of prediction error residuals with high entropy, which can be costly to compress. Consequently, knowledge of the prediction error can help to make a better selection for the value of the quantization parameter, or in general, can help to adjust a technique that controls the bit rate.

One rate control paradigm can include a rate allocation algorithm that assigns bits to each picture and of a rate control algorithm (or "model") that can translate the bit target to a set of coding parameters for the same picture. In some practical situations, the coding parameter that is varied in order to achieve a target bit rate is the quantization parameter, QP. The quadratic model is one such technique that can translate the bit target to a QP. Other rate control techniques can include the rho (p) domain rate control, which is more computationally complex than the quadratic model.

In video codecs, such as H.264/AVC, VC-1, and MPEG-2, a picture may be coded as a predictive picture (P-picture), an intra picture (I-picture), or a bi-predictive picture (B-picture). Some codecs can support additional slice/picture types (e.g., SP and SI slices within H.264/AVC, multi-hypothesis pictures, etc.), and can also consider frame and field coding picture structures. Field and frame coded pictures of the same type tend to have very different coding characteristics. An I-coded picture can use intra prediction from pixels of the same picture. A block in a P-coded picture can also be predicted using motion-compensation from a previously encoded reference picture. Note that this does not have to be a past picture in display order (as in MPEG-2 or MPEG-4 part 2), rather than a past picture in decoding order. This reference picture may not be necessarily the same for each block in the picture and can be selected from a pool of candidate reference pictures. A B-coded picture can consider for prediction the linear combination of two motion-compensated prediction blocks selected from multiple reference pictures.

Future coding modes and picture types can also be supported by our rate control. These could include, for example, (a) prediction of the current block using global motion compensation or an affine motion model, (b) prediction of the current block using a panoramic frame that is created using global motion compensation from a number of input frames, (c) non-linear combination of two or more motion-compensated predictions, and (d) overlapped block motion compensation, among others.

In H.264/AVC the combined predictions may be originating from the same picture or even the same prediction direction (both from the past or both from the future). In terms of the coding tools (e.g., coding modes such as intra or inter prediction) that are available to code a picture, an I-coded picture is essentially a special case of a P-coded picture, and a P-coded picture is a special case of a B-coded picture. In general, I-, P-, and B-coded pictures can have very different coding statistics. For the same quantization parameter and content, I-coded pictures can commonly require more bits than a P-coded picture, while, for image sequences with substantial temporal correlation, B-coded pictures can on average require fewer bits than P-coded pictures. Also, pictures may be coded as a progressive frame or as a pair of interlaced fields. Video content that has been produced using an interlaced camera, as used in television production, can be compressed more efficiently if field coding or macroblock adaptive frame/field coding is used.

Figure 2:
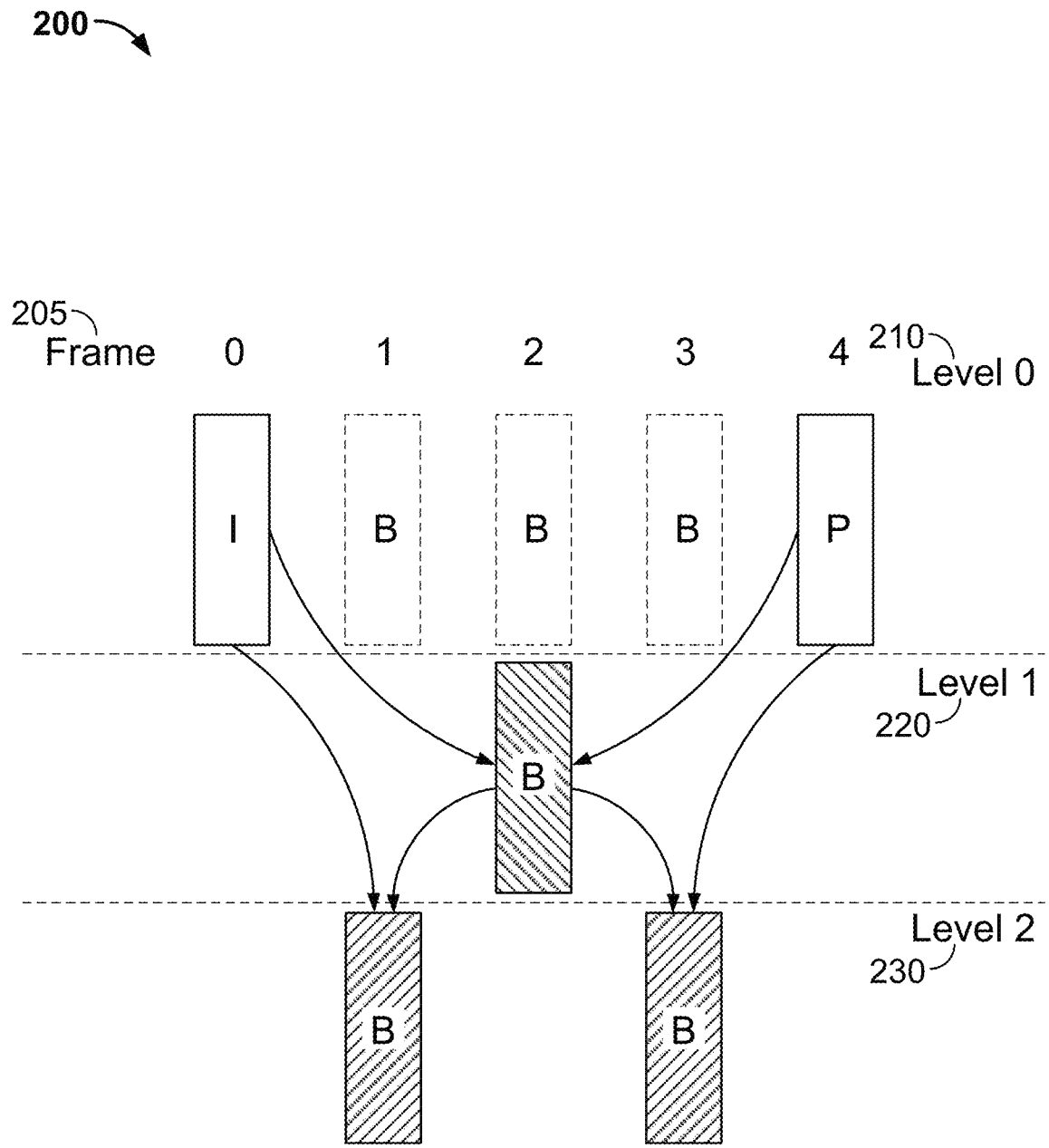
FIGS. 2-5 depict examples of prediction coding structures.

Video codecs can use flexible prediction structures during coding that can adapt to the statistics of the sequence to maximize the quality of the compressed bit stream. In the context of H.264/AVC, it is possible to construct complex prediction structures known as Hierarchical coded pictures, such as those shown in FIGS. 2-5. The implication of these structures to rate control can be important as the rate-distortion performance of each slice type can be affected from its position in the coding structure. As shown in the structure 200 of FIG. 2, for example, a B-coded picture at level 2 (230) can have very different quality/bit rate trade-offs when compared to a B-coded picture at level 1 (220).

FIGS. 2-5 share some similarities. In every hierarchical structure there are different levels, and the most basic level is level 0 (210). Pictures that belong to level 0 (210) have the highest priority, and are required in order to decode any picture that belongs to a level greater than level 0 (210). In general, to decode a picture at level l, pictures that belong to levels 0 through l−1 have to be decoded first. In previous coding standards, such as MPEG-2 and MPEG-4, after encoding picture n there are two options: either predict and encode picture n+1, or predict and encode picture n+m, where m>1, and then use pictures n and n+m as reference pictures for bi-directional prediction of pictures n+1 through n+m−1. Pictures n+1 through n+m−1 may not be decoded unless pictures n and n+m are decoded first. Furthermore, pictures n and n+m may be decoded independently of pictures n+1 through n+m−1. Hence, pictures n and n+m have a higher priority level, level 0, while pictures n+1 through n+m−1 are in level 1. Each one of pictures n+1 through n+m−1 may be decoded independently of each other. In H.264/AVC, however, there can be more complex dependencies within those m−1 internal hierarchical pictures. It is also possible that one encodes picture n+m first and then codes picture n. The value of m could also vary from one section of the encoded sequence to another. The pictures at level 0 (210) can be referred to as the "anchor" pictures.

Figure 3:
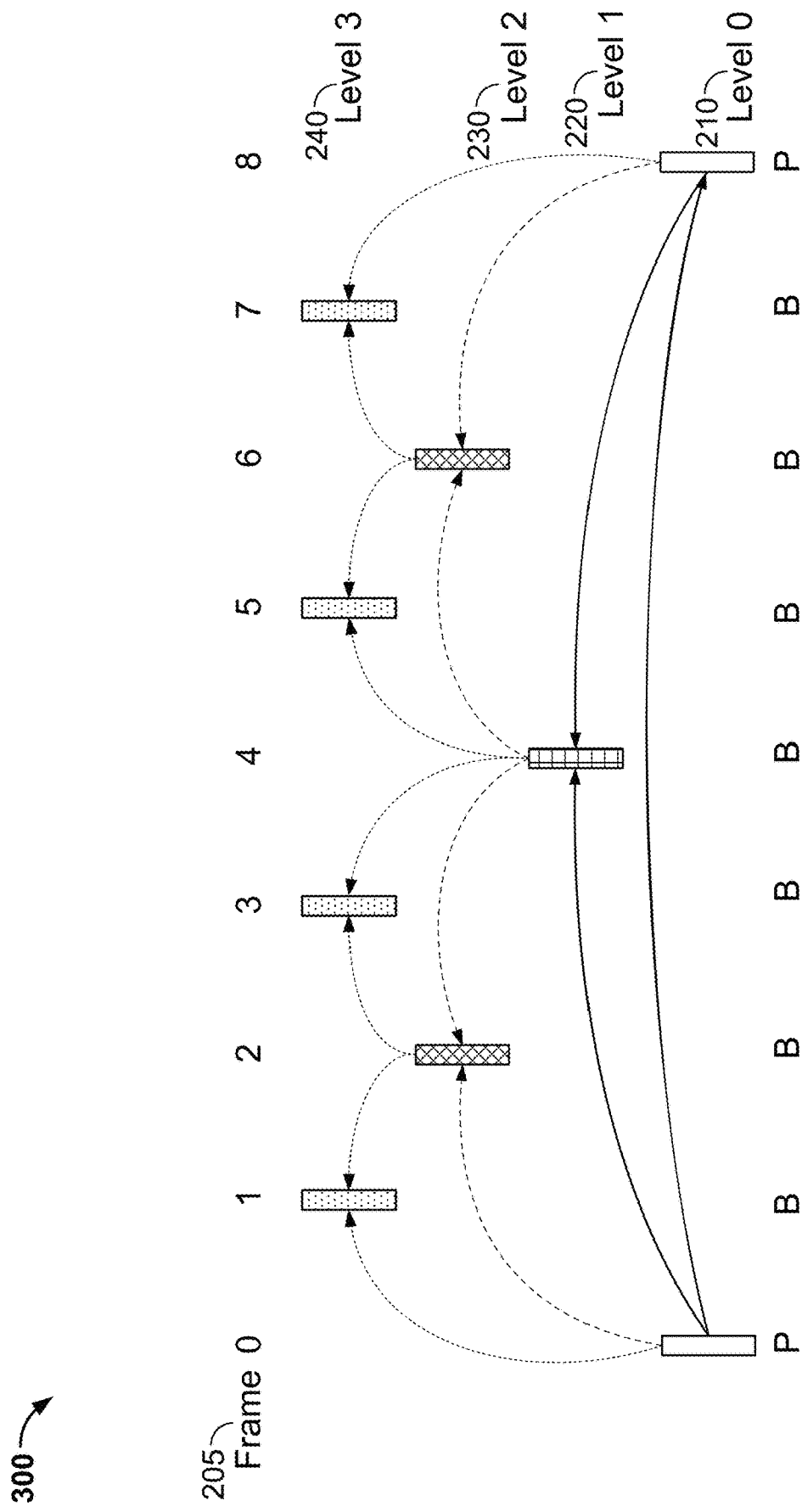

FIG. 3 shows another example prediction structure. After picture frame 0 has been coded, the encoder predicts and codes picture frame 8. The prediction and coding can be performed using an I-coded picture, a P-coded picture (as shown), or a B-coded picture using as references previously coded pictures. Next, picture 4 can be coded as a B-coded picture and using as references pictures 0 and 8. Picture 4 has lower priority than pictures 0 and 8, and therefore, belongs to a different level: level 1 (220). Picture 2 can now be coded as a B-coded picture using as references pictures 0 and 4, which are the temporally closest pictures. Here the temporal prediction distance has a direct effect on compression performance: usually, the closer the reference is to the predicted picture, the higher the correlation, which may result in smaller prediction residuals. Picture 2 has lower priority than picture 4 and 0, and it belongs to a different level, level 2 (230). Still, in another departure from traditional video coding (e.g. MPEG-2), any coded picture may be retained to be used as a reference, and this includes B-coded pictures.

Figure 4:
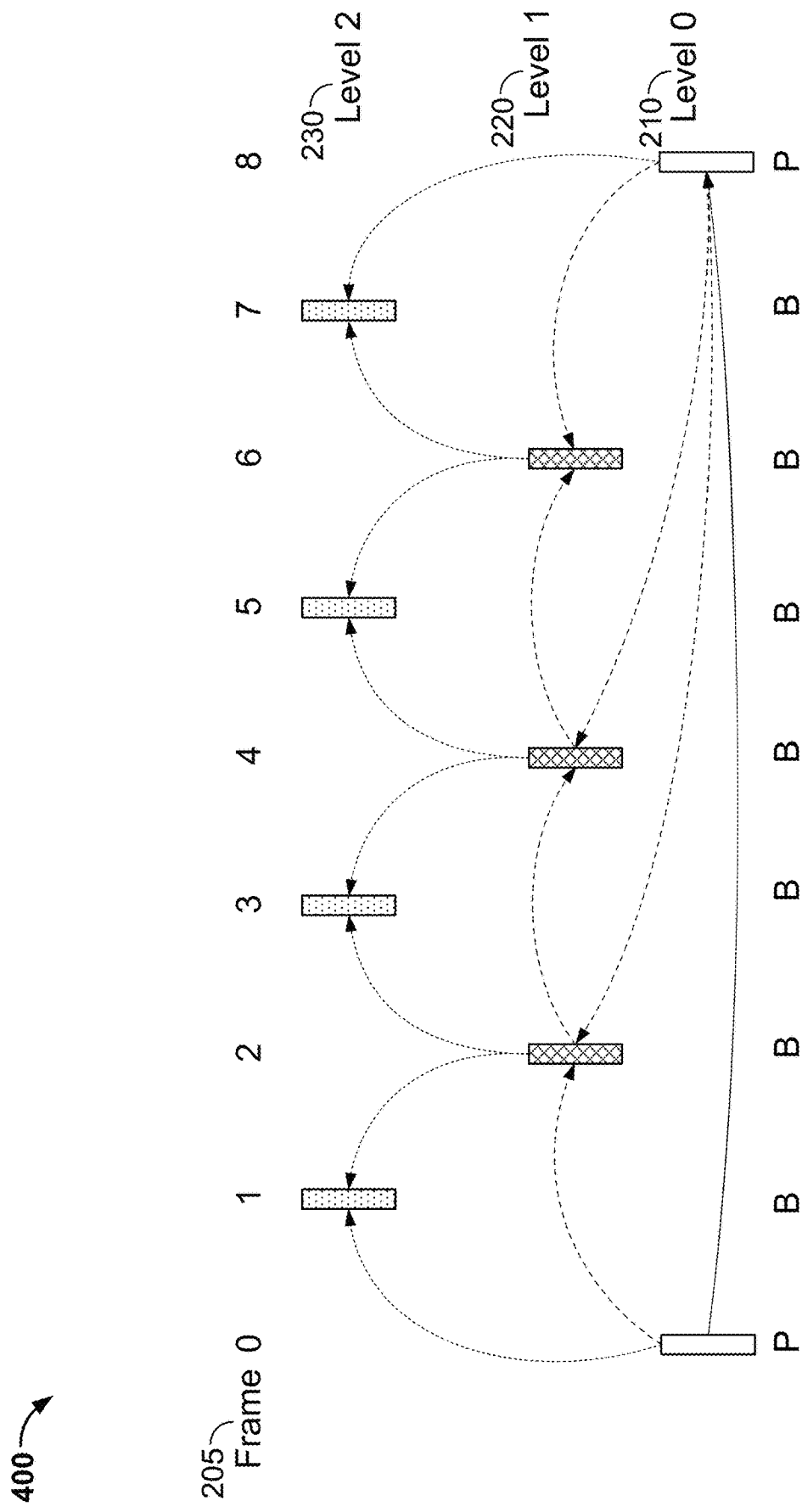
Figure 5:
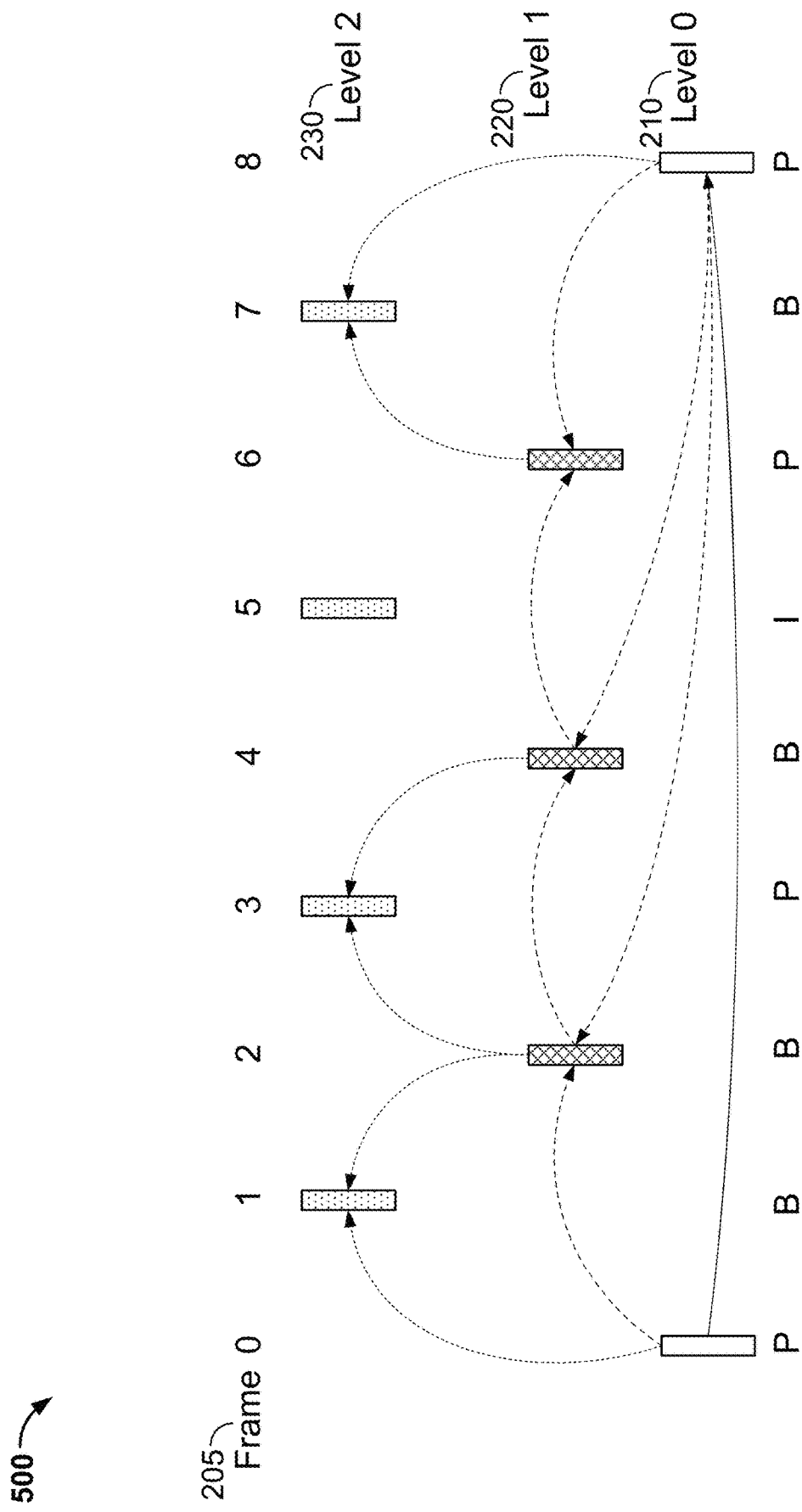

In some implementations, picture 4 has to be buffered as a reference picture. Otherwise, as shown in FIG. 4, picture 2 may have to be predicted from the distant picture 8, which will degrade the compression performance. Consequently, picture 2 can also be buffered as a reference picture and used in conjunction with picture 0 for bi-prediction of picture 1, as shown in FIG. 5. Then, picture 3 can be coded using as references pictures 2 and 4. Pictures 1 and 3 have lower priority than pictures 0, 2, and 4 and therefore belong to lower level (e.g., level 3 240 in FIG. 3, level 2 230 in FIGS. 4-5). The same process can then be repeated for pictures 5, 6, and 7, for example, as shown in FIG. 3.

Even though the above description discusses B-coded pictures, it is possible that pictures 1 through 7 can be encoded with any available coding type within the codec, including the use of multiple slices of I, P, or B type. Furthermore, pictures 1, 3, 5, 7 may be signaled as disposable pictures, which means that they are not used for motion-compensated prediction. This use of picture types can save memory resources and have the capability of introducing temporal scalability. The hierarchical structure used can be arbitrary and does not need to follow a dyadic decomposition. Such structures are shown in FIGS. 4-5. For example, pictures 5 through 7 could be coded differently in FIG. 3 by using pictures 4 and 8 as prediction references, so that picture 7 could be coded as a B-coded picture. Picture 7 can be buffered as a reference to belong to level 2. Next, picture 6 can be coded as a B-coded picture using pictures 4 and 7 as references. Finally, picture 5 can be coded as a B-coded picture using pictures 4 and 7 as references. In this example, pictures 5 and 6 will belong to level 3, and may be signaled as disposable pictures.

Practical video bit streams can be generated using a combination of a multitude of coded picture types that may be suited to the specific scene statistics. In general, the more static the sequence the longer the hierarchical structure can become. Hierarchical structures with different lengths and different prediction configurations can have different rate-distortion performance. Moreover, video content can vary with time and can have varying bit rate requirements to ensure an acceptable quality level. Even within a single scene, some pictures can be easy to compress, while others can create visible compression artifacts for the same compression ratio.

The algorithms presented in this disclosure can address rate allocation and rate control for a video encoder that can consider limited picture look-ahead (of a few seconds duration). Multi-pass algorithms can achieve very high performance since these algorithms can benefit from knowledge of the coding statistics of the entire sequence, and hence, can budget and spend bits accordingly in order to maximize visual quality.

Existing high-performance single-pass rate control algorithms, can employ past coding statistics in order to select the quantization parameter for the current picture. These algorithms can employ some complexity measure for the current picture that is used to modulate the QP so that the target bit rate is achieved. As an example, the x264 open source H.264/AVC encoder can employ the sum of absolute transformed motion-compensated differences using down-sampled versions of the video as that complexity measure.

The schemes described in this disclosure can also consider and benefit from a picture look-ahead, which may impose some coding delay into the system. Such a video coding system is illustrated in the example of FIG. 6.

Figure 6:
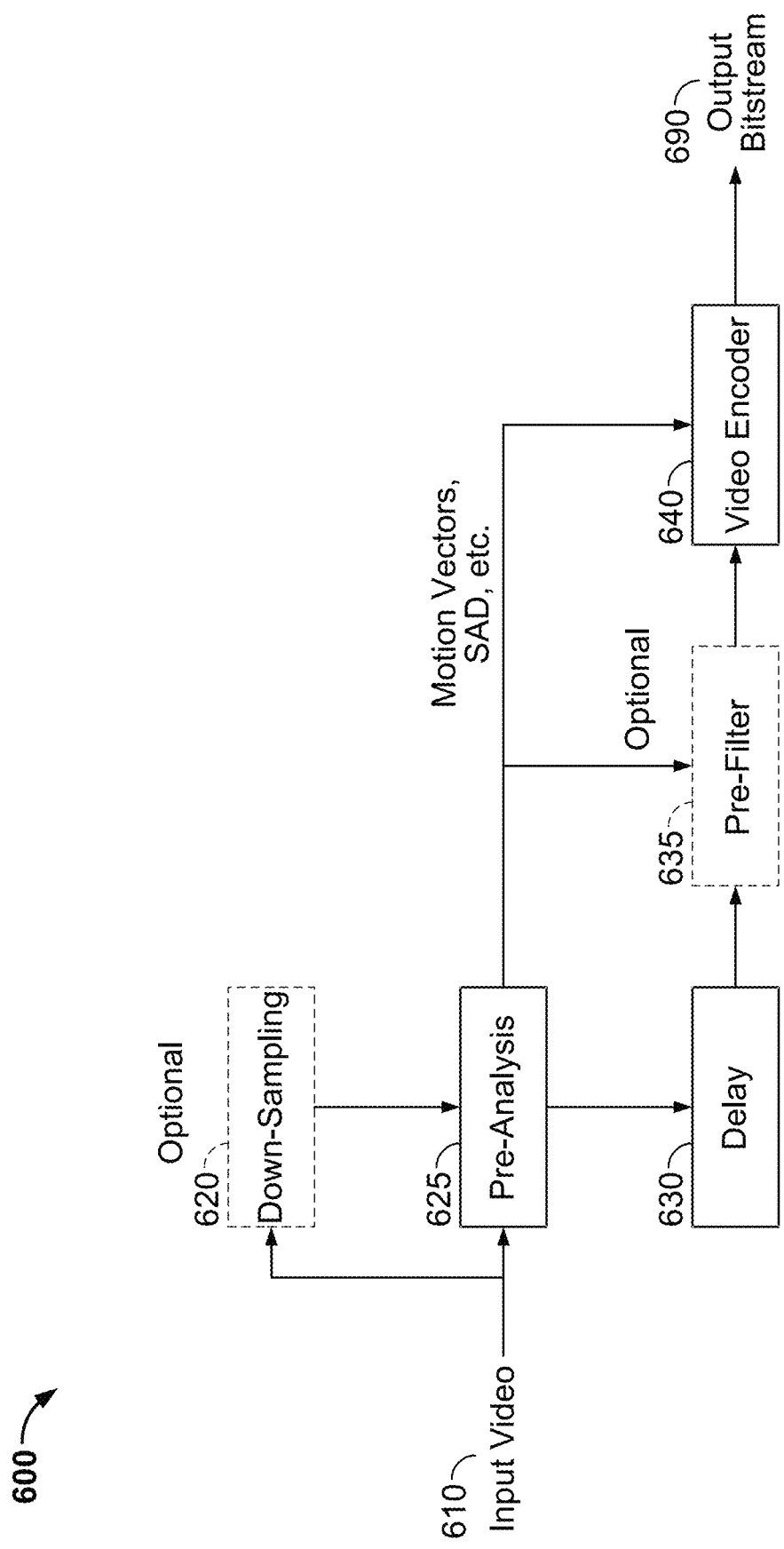
FIG. 6 depicts an example of a video coding system.

FIG. 6 shows an example video coding system 600 that can be used with the disclosed rate allocation and rate control algorithms. In FIG. 6, the input video 610 is sent to the pre-analysis block 625 and an optional down-sampling block, 620, if down-sampling is needed. After the pre-analysis of the video is performed, a delay block 630, a video encoder 640, and an optional pre-filter 635 receive the output of the pre-analysis. The delay block 630 can delay the output of the pre-analysis block 625 from the optional pre-filter 635 and/or video encoder 640. The output bit stream 690 is taken at the output of the video encoder 640.

Complexity Estimation

Some of the disclosed rate allocation and rate control algorithms can base their decisions on some measure of complexity of the current picture i, which is denoted as $c_i$. The complexity of the current picture can indicate whether the picture should be coded at a certain fidelity level. The complexity of a picture can generally be a function of the temporal, spatial, and luminance characteristics, and can be expressed as follows:

$$c_i = g(c_{i,temporal}, c_{i,spatial}, c_{i,luminance})$$

The function g( ) can be a linear or non-linear combination of temporal, spatial, and luminance complexities. For example, if the picture belongs to a very active scene, then details are not going to be visible due to temporal masking caused by the human visual system (HVS). Consequently, it can be beneficial to code that picture so that bits are saved for scenes where these bits are needed more. For example, if the complexity measure denotes that the current picture belongs to a relatively static scene, then details can be preserved since compression artifacts will be visible to the average human observer. These pictures can be coded with greater fidelity than other pictures. The description here can cover mostly temporal masking; however, complexity can also be a function of spatial masking. Scenes with high spatial variance and texture can mask compression artifacts even better due to the spatial structure of the picture (e.g., edges, texture). A third factor that can affect the compressibility of each picture can be luminance masking. In general, pictures with high average luminance (bright scenes) can mask compression artifacts. The opposite can be true for pictures with low average luminance, where compression artifacts are highly visible for the same compression ratio. Hence, dark scenes should generally be compressed with higher fidelity compared to bright scenes.

The complexity of a picture can also be a function of the complexity of future or past pictures. Because coders can employ motion-compensated prediction, if a picture is coded at a certain quality level, and if in the future pictures are sufficiently correlated with it in terms of encoding order, then this initial quality can propagate to these pictures. In these cases, it can be useful to estimate if sufficient future pictures are correlated with the current picture. If certain conditions are met, then this picture can be coded at a higher quality level when compared to neighboring pictures given the rate control requirements. More information on complexity filtering is described in the section below for complexity filtering and QP/bit rate considerations. Temporal complexity can also be a function of the variance and average value of the motion vectors that yield the motion-compensated prediction of the current picture.

Complexity measures, such as the average luminance, the spatial variance, and edge information may be determined at the encoder. However, the temporal complexity/masking measure can require performing motion estimation and compensation, which could be costly in terms of computational complexity. One alternative would be to use zero motion vectors to perform motion compensation, although doing this may considerably reduce the reliability of the complexity estimates and therefore performance. In a different embodiment, motion estimation and compensation can consider a lower spatial and/or temporal resolution version of the sequence to generate these metrics. Motion estimation could be performed within the encoder with a variety of video processing algorithms such as block or region based, or pixel recursive techniques, and motion models including translational, affine, parabolic, and others. This information could also be provided through an external mechanism, which may have already performed this analysis via a separate pre-analyzer that includes motion estimation and compensation. The pre-analyzer can determine the motion-compensated SAD, and/or some other objective or subjective metric that measures temporal correlation for the current picture and/or for a given future and past reference picture.

In another embodiment, the pre-analyzer could be replaced by a video decoder. The decoder could be, for example, any of the following decoder types: MPEG-2, MPEG-4 part 2, VC-1, H.263, or even a AVC decoder. This decoder can decode bit streams of the supported format and provide various information from the bit stream, which could include motion vectors, DCT coefficients, intra and inter coding modes, etc., to the system. This information can be used as complexity metrics in place of the pre-analyzer complexity metrics.

In another embodiment, the pre-analyzer could be replaced by a prior or multiple prior coding passes of the video encoder that can provide all of the above statistics in addition to motion-compensated prediction errors, among other coding statistics. This coding pass can be constrained for the current picture, or can be a full coding pass of the entire video sequence. This can be one of multiple coding passes within a multi-pass video encoder. Statistics from different sources, e.g., a pre-analyzer, a transcoder, and previous encoding passes, could also be used jointly to further improve performance.

It may occur that the distortion metric (e.g., SAD) that was determined by the pre-analyzer corresponded to a motion estimation and compensation process that did not use the same reference pictures as those that will be used during the coding process. During coding, the reference pictures used for coding and the temporal prediction distance can vary to better adjust to the source statistics. For example, for scenes characterized by very high motion, the temporal prediction distance can be small, while for low motion the temporal prediction distance can be increased. Hence, there can be a conversion of pre-computed complexity metrics, e.g., SADs, to predict the metrics that will correspond to the pictures/references that will be used for the actual coding process. This conversion can improve the temporal complexity estimate and, therefore, compression performance, with also little increase in computational complexity.

In an example that approximates a practical coding situation, the pre-analyzer can generate four different motion-compensated distortion metrics (e.g., SAD) for each picture. Each metric can correspond to uni-predictive motion-compensated prediction from a single reference picture: i−1, i−2, i+1, and i+2. The prediction structure used to code a video sequence can vary. The SAD statistics are suited to the particular coding structure in the following manner:

(a) IPPPPP coding structure. The temporal prediction distance can be one picture. Given statistics $SAD_i(n)$, where n is one of i−1, i−2, i+1, and i+2, the temporal complexity $c_{i,temporal}$ can be set equal to $SAD_i(i-1)$.

(b) IBPBPBP coding structure. The temporal prediction distance can involve two pictures from one P-coded picture to the next. The temporal complexity can be set equal to $SAD_i(i-2)$.

(c) IBBPBBP coding structure. The temporal prediction distance can be equal to three. In the specified example, however, the distortion metric values that are available from the pre-analyzer can be constrained to reference only the previous picture (i−1) and the picture (i−2) before that. Hence, there can be an estimate of the temporal complexity (e.g., SAD), which can be performed by extrapolating the values temporally. In this scheme, for example, one of the following complexity estimators can be employed:

(i) $c_{i,temporal} = SAD_i(i-1) + 2 \times (SAD_i(i-2) - SAD_i(i-1))$, (ii) $c_{i,temporal} = SAD_i(i-2) + (SAD_i(i-2) - SAD_i(i-1))$, (iii) $c_{i,temporal} = 3 \times SAD_i(i-1)$, (iv) $c_{i,temporal} = \alpha \times SAD_i(i-1) + \beta \times SAD_i(i-2) + \gamma$ where the three parameters of the linear model ($\alpha$, $\beta$, and $\gamma$) can be initialized with values similar to the models in (i) and (ii), and can then be updated from coding statistics using, e.g., linear regression.

(v) $c_{i,temporal} = \alpha \times SAD_i(i-1) + \beta \times SAD_i(i-2) + \delta \times SAD_i^2(i-1) + \varepsilon \times SAD_i^2(i-2) + \gamma$, where the parameters of the quadratic model ($\alpha$, $\beta$, $\gamma$, $\delta$, and $\varepsilon$), can be updated with coding statistics using, for example, a linear regression algorithm.

However, the above estimates can be further improved with the use of SADs of neighboring pictures, i−1, i−2, i+1, and i+2. For example, using these SAD values, temporal complexity can be estimated as follows: $c_{i,temporal} = SAD_i(i-2) + SAD_{i-2}(i-3)$. The generic complexity estimator can be the following.

$$c_{i,temporal} = \eta + \left( \sum_{n=i-N}^{i+N} \sum_{m=n-M}^{n+M} (w_{n,m} + v_{n,m}) \right)^{-1}$$

$$\left[\sum_{n=i-N}^{i+N}\sum_{m=n-M}^{n+M}\left(w_{n,m}\times SAD_n(m)+v_{n,m}\times SAD_n^2(m)\right)\right]$$

Parameter η can be a variable that depends on a variety of factors such as bit rate and buffering constraints, among others, and the weights $w_{n,m}$ and $v_{n,m}$ can be initialized in a variety of ways. These variables can also be adaptively updated using past coding statistics, and using techniques such as linear regression, among others. Parameters N and M can be constrained by a number of reference pictures that were used during motion estimation at the pre-analyzer. If two pictures in the past and two pictures in the future were used, then M=2, while N depends on both M and the prediction distance d. In some embodiments d can be set to 3. The parameter N could also be set to N=max(d,M), where the weighting parameters are not blindly updated by the regression algorithm, and are used as is. This parameter can be modified instead based on the scene characterization, e.g., if a picture is designated as a scene change then the weight is set to zero. Alternatively, we can also constrain the weights to zero if the picture being predicted and the reference picture belong to different scenes, e.g. the scene change happens between these two pictures. The same constraint can be applied if either the estimated picture or the reference picture does not belong to the same scene as picture i.

(d) IBBBPBBBP coding structure. The temporal prediction distance can be equal to 4. This situation can be similar to that of (c) where the available distortion metrics considered reference pictures with distance less than or equal to 2. One solution that can be used to estimate the temporal complexity is the generic complexity estimator using the five-parameter quadratic model as shown above in (c)(v). Some other estimators that can be used include the following:

$$c_{i,temporal} = 2\times SAD_i(i-1) + 3\times SAD_i(i-2),$$

$$c_{i,temporal} = 2\times SAD_i(i-2),$$

$$c_{i,temporal} = 3\times SAD_i(i-2) - 2\times SAD_i(i-1),$$

$$c_{i,temporal} = SAD_i(i-2) + SAD_{i-2}(i-4).$$

Although numerous combinations are possible, these can all be special cases of the generic complexity estimator solution treated in (c)(v).

(e) IBBBBBP coding structure. The temporal prediction distance can be equal to 6. The situation also can be similar to that of (c) where the available SADs use reference pictures with distance less than or equal to 2. One solution that can be used to estimate the temporal complexity is the generic estimator as shown in (c)(v). Some other estimators that can be used include the following:

(i) $c_{i,temporal} = 4\times SAD_i(i-1) + 5\times SAD_i(i-2).$ (ii) $c_{i,temporal} = 2\times SAD_i(i-2) + SAD_i(i-1).$ (iii) $c_{i,temporal} = 5\times SAD_i(i-2) - 4\times SAD_i(i-1).$ (iv) $c_{i,temporal} = SAD_i(i-2) + SAD_{i-2}(i-4) + SAD_{i-4}(i-6).$ Although numerous combinations are possible, these can all be special cases of the generic solution previously mentioned in (c)(v).

The above temporal complexity determination can be valid mainly for pictures that belong to the highest priority level (level 0) in the compressed bit stream (e.g., they may not be disposable and may be required to decode the sequence at its full length). The same determination also can be applied for P- or B-coded pictures that are disposable or have low priority. When pictures with lower priority are discarded, the image sequence can still be decoded at its full length, but at a lower frame rate. If only unipredictive SAD statistics are available, the complexity estimation above can be valid for the highest priority level B-coded pictures by performing the following substitution:

$SAD_i(\text{reference}) \leftrightarrow \min(SAD_i(R0(i)), SAD_i(R1(i)).$

Terms $R0(i)$ and $R1(i)$ represent the indices of the two references that are used for the bi-prediction of picture i. The SAD metrics in this scenario can be based only on unipredictive motion estimation. However, if there is access to bi-predictive statistics then the bipredictive SAD can be used in place of the above substitution. The complexity estimation scheme is the same for both cases.

For I-coded pictures, however, complexity may no longer be based on temporal correlation. The complexity of I-coded pictures can depend on spatial characteristics, such as variance, edge, and texture information. The complexity can be determined as the weighted average of the variance of $b_x \times b_y$ blocks (e.g., $b_x = b_y = 8$), the edge orientation and magnitude using a Gradient filter (e.g., Sobel or Prewitt), and texture characteristics. For example, texture information could be derived by considering the sum of the squares of all or some (e.g., high frequency) of the transform coefficients of a block. In some embodiments, the transform can be the discrete cosine transform or some other similar transform, e.g., hadamard, integer DCT approximation, Karhunen Level transform (KLT) etc., or even some wavelet transform. For some low complexity applications, the complexity of I-coded pictures can depend only on the variance and edge information.

The complexity can be estimated, and can affect the coding parameter allocation for the current picture. After the picture is coded, coding statistics can be gathered to allow correction of the initial complexity estimate, which can also be based on some regressive model that analyzes the relationship between the estimated complexities and the actual ones after coding. The corrected complexities can be used during filtering of complexities by subsequent pictures in coding order. Complexity filtering is discussed in detail in the following section. Optionally, the corrected complexities could be used as the complexity measures for a sub-sequent coding pass when multiple coding passes are used to code the image sequence.

Figure 7:
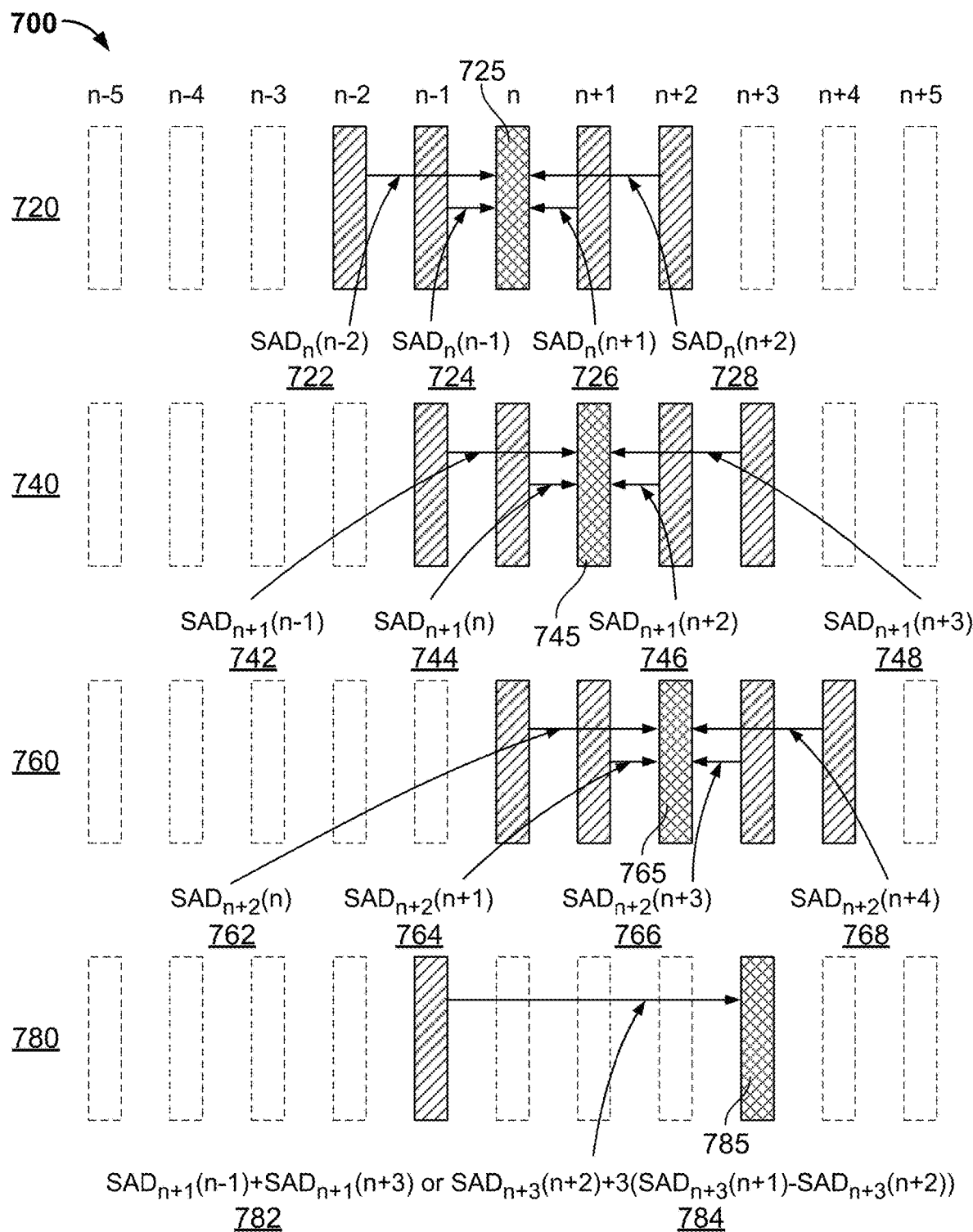
FIG. 7 depicts examples of SAD estimation from values that have been pre-computed at the pre-analyzer.

FIG. 7 shows an example for coding complexity estimation where the temporal prediction distance is equal to four. In FIG. 7, the top three rows of sequences 720, 740, 760 are known statistics (e.g., distortion or complexity between pictures), but there may not be information on how certain pictures relate to one another (e.g., there is no explicit knowledge of how picture n relates to picture n+3). However, there may be information between other pictures. For example, there may be some information on the dependency of n+1 with n+3, and between n and n+1. Using this information, there can be an extrapolation to determine, for example, the statistics between n and n+3. The last row of the sequence 760 can show how the information (e.g., complexity or distortion) is determined between n and n+3. In other words, the unknown complexity (e.g., of n+3 compared to n) can be determined by considering the information of adjacent pictures (e.g., from n to n+1 to n+2).

In FIG. 7, complexity can be extracted for values, in particular values that have been pre-computed at the pre-analyzer (as in FIG. 6). FIG. 7 shows several sequences 720, 740, 760, and 780 of pictures with SAD values (values $SAD_n(n-2)$ 722, $SAD_n(n-1)$ 724, $SAD_n(n+1)$ 726, $SAD_n(n+2)$ 728 for sequence 720; values $SAD_{n+1}(n-1)$ 742, $SAD_{n+1}(n)$ 744, $SAD_{n+1}(n+2)$ 746, $SAD_{n+1}(n+3)$ 748 for sequence 740; values $SAD_{n+2}(n)$ 762, $SAD_{n+2}(n+1)$ 764, $SAD_{n+2}(n+3)$ 766, $SAD_{n+2}(n+4)$ 768 for sequence 760; values $SAD_{n+1}(n-1)+SAD_{n+1}(n+3)$ 782, $SAD_{n+3}(n+2)+3(SAD_{n+3}(n+1)-SAD_{n+3}(n+2))$ 784 for sequence 780). In FIG. 7, past information (e.g., $SAD_n(n-2)$ 722, $SAD_n(n-1)$ 724) and future information (e.g., $SAD_n(n+1)$ 726, $SAD_n(n+2)$ 728) can be used for SAD estimation for related information for frame n 725 in a sequence 720. In some implementations, the past statistics (e.g., $SAD_n(n-2)$ 722, $SAD_n(n-1)$ 724) and the future statistics (e.g., $SAD_n(n+1)$ 726, $SAD_n(n+2)$ 728) are known when coding a frame n 725. The statistics can be used to estimate the error, such as distortion. In some implementations, some complexities may not be known, such as how one picture relates to another picture. But, these unknown complexities can be estimated based on other known complexities. Sequence 780 shows how to form an estimate of the complexity for picture n-1 compared to n+3 (e.g., $SAD_n-1(n+3)$) via using the dependencies of other known statistics. For example, $SAD_n$ is in sequence 720, $SAD_{n+1}$ is in sequence 740, $SAD_{n+2}$ is in sequence 760, and $SAD_{n+2}$, and sequence 780 is a combination of sequences 720, 740, and 760 with $SAD_{n+3}$.

In sequences 720, 740, and 760, the respective frame n 725, 745, 765, are known within a range close to the estimated value. For example, adjacent pictures may be similar to one another. This similarity can relate to how complex it could be to code these pictures in the future. This can provide information for the rate allocation. The more complex the coding, the more bits may be required for rate control and rate allocation. Information for a more distant picture compared to picture n can be estimated by mathematical operations on the distortion values from other sequences (e.g., values $SAD_{n+1}(n-1)+SAD_{n+1}(n+3)$ 782, $SAD_{n+3}(n+2)+3(SAD_{n+3}(n+1)-SAD_{n+3}(n+2))$ 784 for sequence 780).

Even though the motion-compensated SAD was used above to estimate the temporal complexity, the above methodology can also be applicable to a variety of objective and subjective metrics that measure spatial and temporal correlation. Metrics that measure the perceptual impact of the prediction error could be used in place of the SAD. For example, errors at high luminance pixel values may not be as visible as errors at low luminance pixel values. Furthermore, the traditional SAD metric is block-based and measures the distortion within the predicted block. New techniques could employ a metric that measures distortion along block boundaries, so that not only intra-block distortion can be minimized, but inter-block distortion may be minimized as well. The latter can be important since it may cause blocking artifacts. Also, the above methodology can be used with distortion metrics that are extended in the temporal direction so that temporal flickering artifacts can be reduced as well. For example, minimizing the error for the current block may not be enough when viewed in light of also minimizing the difference between the prediction error of the current block and the prediction error of the block in the previous picture that is most correlated to the predicted block.

Apart from replacing the metric that estimates the complexity for the current picture, multiple metrics can be used to derive multiple candidate coding parameters sets. From these, a selection can be made for the best set by minimizing some other metric or metrics. This can require maintaining separate rate control models that make use of different complexity metrics. For example, one rate control model could derive coding parameters using the SAD, while another rate control model could derive coding parameters using the MSE or a metric that minimizes temporal flickering. A decision module that operates under some constraint (e.g., minimizing another comprehensive metric) can select an appropriate set of coding parameters from the two candidate sets. The coding parameters can be combined in a linear or non-linear fashion. If, for example, both metrics result in the same coding parameters, e.g., the same value for quantization parameter QP, then no other operation may be needed. Otherwise, the average, minimum (optimistic allocation), or maximum (pessimistic allocation) of the two could be selected. In an alternative implementation, if the two metrics result in different parameters, an additional metric or multiple additional metrics could be considered to determine the most appropriate coding parameters. In another implementation, assuming the use of N metrics resulting in N possible coding parameters, the parameters with the highest occurrence among these N can be selected. A general diagram of this method is shown in FIG. 8.

Figure 8:
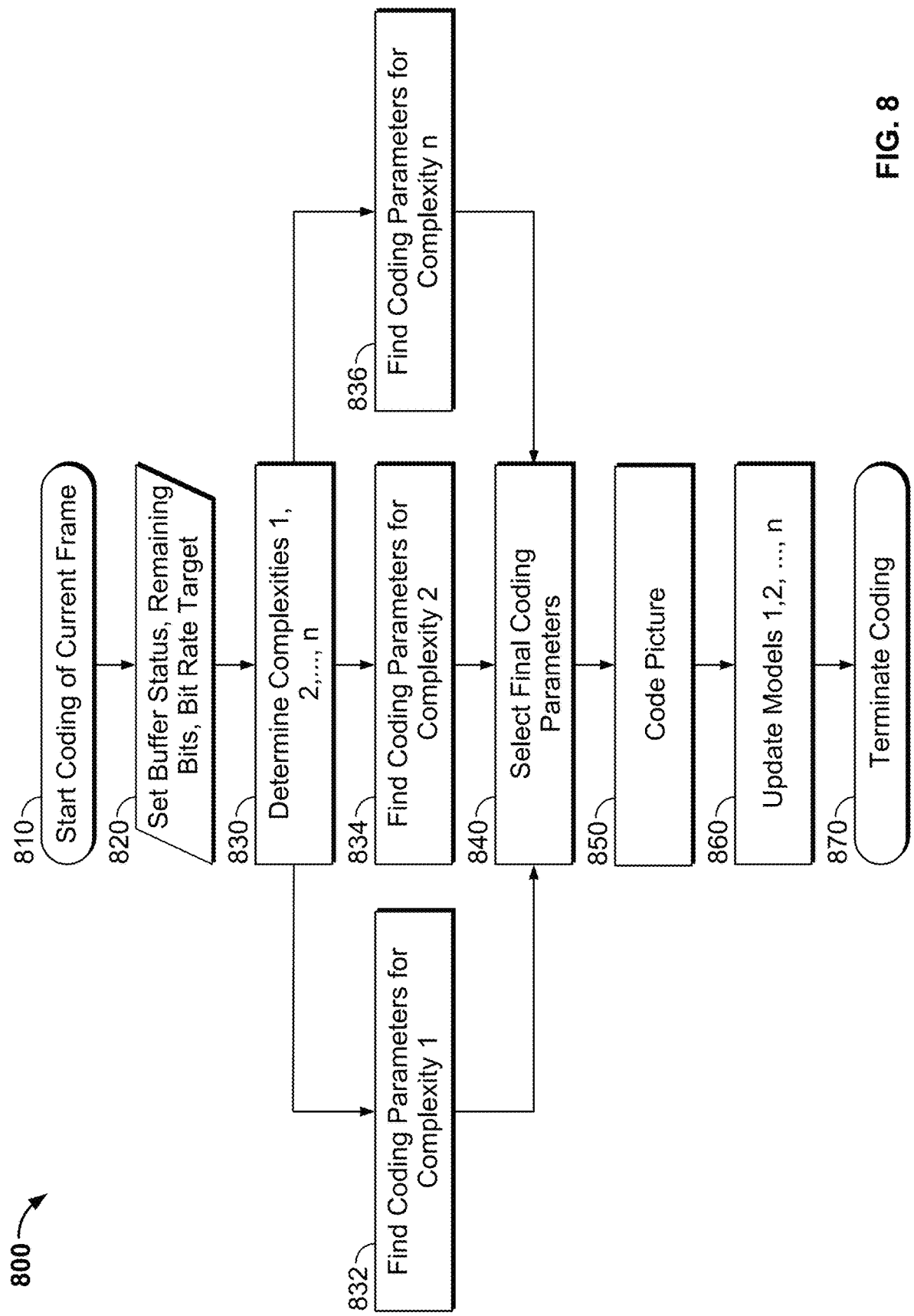
FIG. 8 depicts a flowchart for an example of a combination of multiple rate control models.

FIG. 8 shows a flowchart 800 for a combination of multiple rate control models that are based on different complexity metrics to derive a final coding parameter set. The coding for a current frame is started 810 and the buffer status, remaining bits, and bit rate target are set 820. The complexities are determined 830 from 1, 2, . . . , n and the coding parameters for complexity 1 832, the coding parameters for complexity 2 834 and the coding parameters for complexity n 836 are determined. Then the final coding parameters are selected 840 and the coded picture 850 is generated. Then models 1, 2, . . . , n are updated 860 and coding is terminated 870.

The picture can be encoded using all N parameters. Then a selection can be made for the parameter set for a final encoding that satisfies some other criterion, e.g., select the one that has the best rate distortion performance or the one that better satisfies buffering constraints. A diagram of this method is illustrated in FIG. 9.

Figure 9:
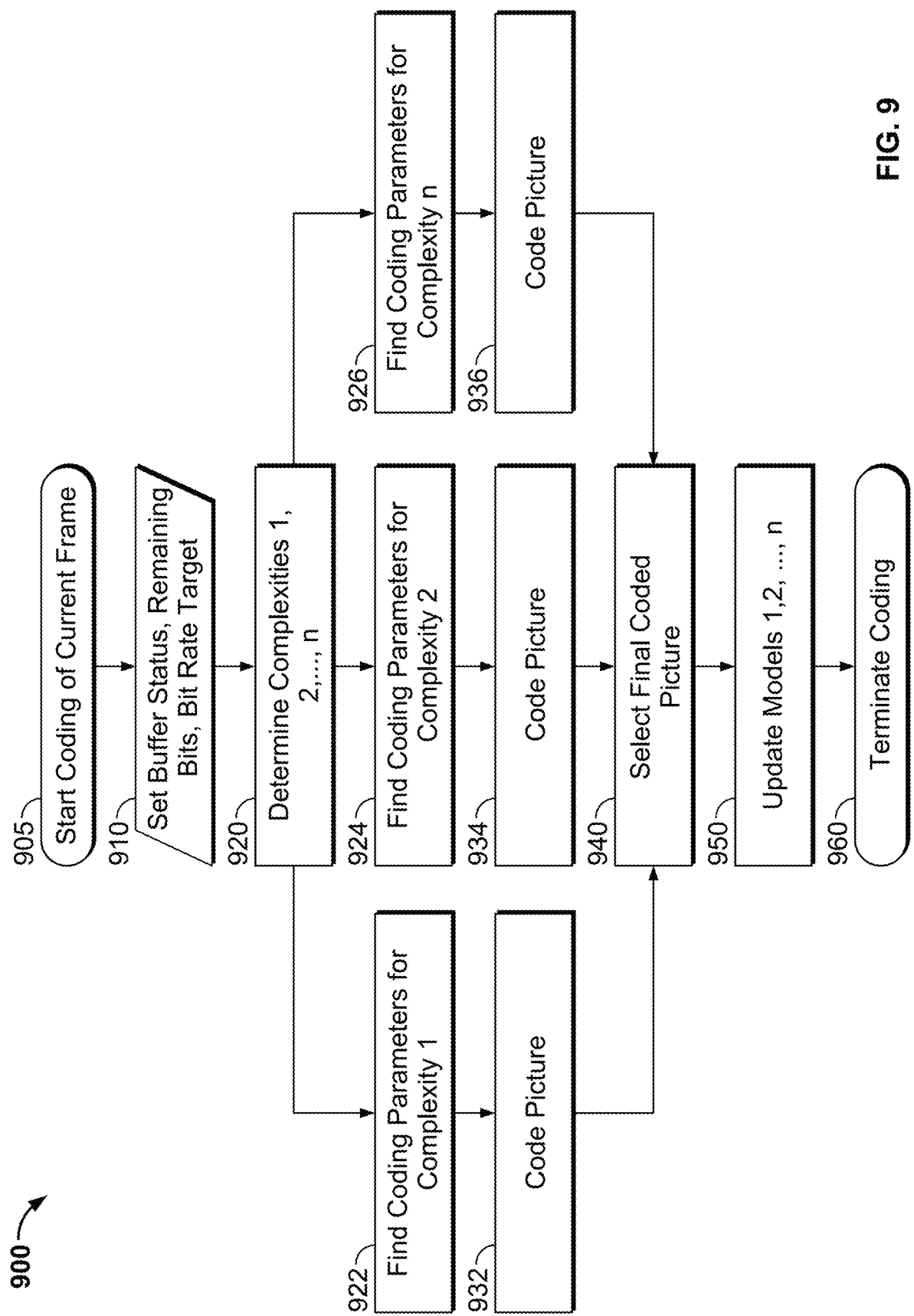
FIG. 9 depicts a diagram of an example of encoding a picture using N coding parameter sets.

FIG. 9 shows a diagram of encoding a picture using N parameters. The coding for a current frame is started 905 and the buffer status, remaining bits, and bit rate target are set 910. The complexities are determined 920 from 1, 2, . . . , n and the coding parameters for complexity 1 922, the coding parameters for complexity 2 924 and the coding parameters for complexity n 926 are found. Then, the coded picture is generated 932, 934, and 936 and the final coded picture is selected 940. Then models 1, 2, . . . , n are updated 950 and coding is terminated 960.

Another possible example, could involve two models, where one determines coding parameters to minimize the SAD, while the other determines coding parameters to strictly satisfy the buffering constraints. If the buffering constraints can be relaxed, a combination of the two sets of coding parameters could be a good trade-off for both constraints. This methodology can be applied to an arbitrary number of complexity types.

Complexity Filtering and Quality/Bit Rate Considerations

While the effects of luminance and spatial masking may be quantified as the average luminance, the variance, and the edge content of a picture, the same may not be true for temporal masking. In the previous section, a description was provided on the estimation of temporal complexity for a single picture. Temporal masking can be a simple function of the motion-compensated prediction error (sum of absolute differences −SAD) of the current picture.

In some cases, where, for example, the content is also characterized by high spatial activity/texture, and/or the distortion is high, it is possible that artifacts may not be as perceivable due to temporal masking. The distortion can be high due to very high motion (including motion blur) or inefficiency of the motion estimation process to best capture the actual motion. In such a case, the allocated bits for this area could be lowered since the additionally introduced compression artifacts, due to the higher compression, may not be easily perceivable. This can, in a sense, save bits for other areas that are deemed to be more important subjectively. However, such a scheme can be problematic when complexity varies temporarily. These variations can lead to visual quality fluctuations that can be detrimental to the subjective video quality of the compressed video bit stream.

A technique that can be used to alleviate this problem is to filter the complexity of the current picture with that of previous pictures. If the complexity changes significantly for the current picture, the coding quality/bit rate variation should be controlled so that it is smoother and not noticeable by the average human observer.

In the proposed rate control algorithm, the filtering of complexities is extended from previous pictures to also include the complexities of future pictures. Also, a few examples are provided to demonstrate why this technique would be beneficial for the subjective quality of the compressed video.

If future pictures that depend on the current picture are found to have high coding complexity compared to the current picture, and if it is deemed that temporal masking can help to reduce the visual impact of any compression artifacts, it can be determined that it is best to encode the current picture at a lower bit rate or, equivalently, lower visual quality than it was originally selected. As a benefit, this can help to avoid spending bits on pictures that may not be as important to encode with high fidelity since compression artifacts will be temporally masked. This also can help to use the saved bits to encode other, more important pictures visually.

Similarly, if the upcoming pictures exhibit high temporal correlation, or equivalently, low coding complexity/distortion compared to the coming picture, then the current picture can be coded at a higher fidelity level, since the added quality will be visible and will propagate to these pictures.

The filtered complexity for the current picture i can now be written as follows:

$$\hat{c}_i = \sum_{j=-N}^{N} w_j c_{i-j}.$$

A novelty of the method above lies not only in the consideration of future picture complexities, but also on the point that the weighting coefficients $w_j$ are adapted based on picture and sequence characterization. Parameter N can depend on many factors, such as the extent of the look-ahead (delay) available to the encoding system, the computational and memory budget, and the frame rate of the source content, among others. As N increases, a point of diminishing returns will eventually be reached.

The weighting coefficients $w_j$ can be determined as functions of the initial weighting parameters $v_j$, which are selected to resemble any distribution. In some embodiments, the distribution can be some curve that is center biased (j=0), where its largest value lies at zero. In other embodiments, the curve may be a Gaussian, exponential or some linear or quadratic function. In an implementation of this algorithm, these parameters can be modified by carefully considering scene characterization information. In an optional implementation, the values of the initial parameters $v_j$ can be updated through the use of some regression algorithm that attempts to minimize the difference between the estimated complexity and the observed one (e.g., this could be the number of bits spent for a picture given the coding parameters that were used to encode it). The effect of each scene type on the weighting parameter can be different depending on whether j=0 or j≠0. A discussion of an effect of each scene type on the derivation of the final weighting parameters is given below.

Scene Changes

Scene transitions can constrain the temporal extent of the filtering both in the past and the future direction. The filtering of pictures in the past can begin with those pictures that are the closest to the current picture and can terminate once a scene change is encountered. The same can be true for filtering future pictures where the filtering can start with the closest pictures to the current picture and can terminate when a scene change is encountered. In this latter case, the complexity of the scene change may not be taken into account. Assume that $k_1 < i < k_2$ and that the closest scene changes before and after the current occur at pictures $k_1$ and $k_2$. The weighting parameters that can be used to filter the complexity of picture i will be determined as follows:

$$w_j = \begin{cases} v_j, & \max(i-N, k_1) - i < j < \min(i+N, k_2) - i \\ 0, & \text{otherwise} \end{cases}$$

When the current picture is designated as a scene change, then the temporal complexity of that picture can be unreliable since it is only based on the motion-compensated SAD. A scene change can cause an artificially high SAD value, which, if used to allocate bits for the current picture, may result in severe compression artifacts or destabilize the rate control. However, as discussed above, the complexity of intra-coded pictures here is described as a function of their spatial statistics, and thus, the pictures may be included in the complexity determination. Furthermore, the disclosed algorithm for complexity estimation for the scene changes can use the complexity of future pictures that belong to this new scene. Filtering can be terminated again if a new scene change is detected, and the complexity belonging to that picture may not be used in the relationship that is shown below:

$$w_j = \begin{cases} v_j, & 0 \le j < \min(i+N, k_2) - i \\ 0, & \text{otherwise} \end{cases}.$$

The consideration, through early detection, of scene changes also can be useful for pre-budgeting bits in cases where tight buffer rate control is required. If the encoder approaches an already detected scene change, then bits can be saved from the last few pictures of the current scene and can be conserved for the upcoming new scene. This can be implemented by using slightly worse QPs or by using coding modes and/or parameters that would result in using fewer bits compared to the coding parameters derived by the rate control for pictures prior to a scene change. The change in QP, or some other coding parameter, can potentially be more significant at lower bit rates compared to higher bit rates, to ensure that there will be enough bits to allocate to the new scene.

Fade-Ins/Fade-Outs

Fade transitions can be characterized by global illumination changes. During fades, the motion-compensated SAD can increase compared to the SAD values of previous pictures that had similar content and motion but were not part of a fade. This can be generally true when weighted prediction is not used. But even in the case of weighted prediction, the SAD can still be likely to increase. The end effect can be that the picture can be considered to have high complexity and hence compression artifacts can be difficult to spot. Unfortunately, this may not be true with fades because fades may require a lot of bits in order to be compressed at an acceptable quality level. As a result, in some of the disclosed algorithms, temporal complexity can be determined as the average of complexities of neighboring pictures, where pictures that do not belong to a fade scene transition may receive a larger weight than pictures that do, depending on whether weighted prediction is used or not. Similarly as before, complexities of pictures belonging to scene changes can be excluded. Assuming, for example, that the fade-in starts from picture $l_1$ and finishes at picture $l_2$, and that picture i belongs to the fade-in, the weighting parameters are modified as follows:

$$w_j = \begin{cases} \beta \times v_j, & \min(i+N, l_2) - i < j < \min(i+N, k_2) - i \\ \alpha \times v_j, & \max(i-N, l_1) - i < j \le \min(i+N, l_2) - i \\ 0, & \text{otherwise} \end{cases}$$

The situation can change when there is a fade-out, where the interesting content (e.g., the content that is to be filtered) lies before the start of the fade-out. Assuming, for example, that the fade-out starts from picture $l_1$ and finishes at picture $l_2$, and that picture i belongs to the fade-out, the weighting parameters are modified as follows:

$$w_j = \begin{cases} \beta \times v_j, & \max(i-N, k_1) - i < j < \max(i-N, l_1) - i \\ \alpha \times v_j, & \max(i-N, l_1) - i \le j < \min(i+N, l_2) - i \\ 0, & \text{otherwise} \end{cases}$$

Parameter $\alpha$ should be set to a value less than one, and in many cases can be equal to zero. For encoders, such as the Baseline profile of the H.264/AVC video coding standard, the value should be close to zero. In some embodiments, if an encoder is used that supports weighted prediction then the value can be non-zero. Still, the parameter $\alpha$ can be constrained as follows: $0 \le \alpha \le 1$. Parameter $\beta$ can be constrained as follows: $0 < \beta \le 1$ and can serve an important purpose: if Parameter $\beta$ is less than one, it can ensure that the fade will be coded at a higher fidelity than either the end (fade-out) or the beginning (fade-in) of the scene. This follows from the above discussion on the increased visibility of artifact during fades. In another constraint $\beta > \alpha$.

Alternative techniques that can be used to code fades can include:
using the same fixed coding parameters to code the entire fade scene transition determined from the average complexities of the pictures prior to the fade;
adding a modifier (e.g., a QP modifier) that can improve the coding parameters used to code pictures belonging to fades; and
constraining the coding parameters that encode the fade to always result in better quality than the coding parameters used to encode the pictures before or after the fade, as discussed in the previous paragraph, through the use of parameter B.

In general, the disclosed algorithm can have at least two modes, depending on the fade type:
for a fade-in, the coding parameters used to code the fade can result in better quality than the coding parameters that will be used to code the pictures that follow the end of the fade; and
for a fade-out, the coding parameters used to code the fade can be better than the coding parameters that are used to code the pictures that precede the start of the fade.

When weighted prediction is used, the above two conditions can be relaxed (through the use of parameter a), since weighted prediction can account for the global illumination change.

The fade discussion above concerns the cases where the current picture i belongs to the fade. However, when filtering is applied for a picture that is not a fade, it is possible that due to the length of the filtering operation, the complexities of pictures that are fades can be considered as well. In that case, an approach can be used where pictures, for which filtering has already been applied, are included in the determination using their filtered complexity values. Otherwise, the complexity value that is used can be equal to its original value times a parameter that is not greater than one.

Similarly to the case of scene changes, if the weighted prediction support of the video codec is insufficient, then the early detection of fades can be used by the rate control to either pre-budget bits or to avoid using coding parameters that may use up a lot of bits prior to the fades.

Cross Fades

Cross fades are fade transitions that connect two consecutive scenes. For these scene transitions, an approach is to first determine the average complexity for the scenes before and after the transition. In an example, an assumption can be made that the cross-fade starts from picture $l_1$ and finishes at picture $l_2$, and that picture i belongs to the cross-fade. The weighting parameters can then be modified as follows:

$$w_j = \begin{cases} \beta \times v_j, & \max(i-N, k_1) - i < j < \max(i-N, l_1) - i \\ \beta \times v_j, & \min(i+N, l_2) - i < j < \min(i+N, k_2) - i \\ \alpha \times v_j, & \max(i-N, l_1) - i \le j < \min(i+N, l_2) - i \\ 0, & \text{otherwise} \end{cases}$$

Parameters $\alpha$ and $\beta$ can be selected so that the complexity of the scenes has more weight than the complexity of the fade itself. Pictures belonging to the scenes at either side of the cross-fade are weighted with $\beta$, while pictures that belong to the fade contribute much less to the complexity determination for the current picture i.

When a picture that is designated as a cross-fade contributes to the complexity determination of neighboring pictures, an approach that can be adopted can mirror the approach for fade-ins and fade-outs, where already-filtered pictures can contribute the filtered complexity value, while pictures that have not been filtered can contribute their original complexity value.

Consequently, the fade transition can be coded with coding parameters that result to at least better or equivalent quality (due to $\beta>\alpha$) than the coding parameters that will be used to code the pictures of the two scenes. The coding parameters can be fixed to constant values, as described above for the fade-in/out case, or can vary but still be constrained to be better than the coding parameters used to code the scenes themselves. Assuming that the filter length is long enough for both prediction directions, the complexity of the current picture in the cross-fade can be a function of both the previous and the next scene.

Flashes

Flashes involve large and instantaneous illumination changes that are detrimental to compression performance and can be addressed primarily through weighted prediction or use of intra coding methods. As a result, their filtered complexity should be kept close to their original (high) value. A normal filter that accounts for scene changes and fades, as described above, can be good enough to produce the filtered complexity of the flash picture. Alternatively, the weight for the center (j=0) could be increased. When, however, a flash picture is within the filtering range of a neighboring picture, the abnormally high complexity of that picture can decrease the bits allocated to neighboring non-flash type pictures. One approach to this problem is to decrease the filtering coefficient $w_j$ if the picture j is a flash. The coefficient can be multiplied by a parameter that is not negative, but always less than one.

Consequently, pictures that are detected as flashes can be coded at a lower quality (not necessarily using fewer bits) compared to their neighboring pictures. A reason for this coding is because the brief duration of the flashes can mask compression artifacts. Another reason is that the bits spent on those pictures will rarely benefit any future pictures. However, one case in which this could happen is when there are multiple flash pictures close to each other. In this scenario, it is plausible that they belong to the same scene and are highly correlated. Thus, the flashes may be buffered as reference pictures. Otherwise, if the flashes are isolated, it is beneficial if they are not buffered as references.

Local Illumination Changes

This scene type resembles flashes, but can differ in the spatial extent of the illumination change. Illumination changes may only involve a part and not necessarily the entire picture. Because some parts of the picture will retain similar lighting characteristics with past and future pictures, and depending on the support or nonsupport of weighted prediction by a codec, then these pictures can be retained as prediction references. As discussed above for the flash scene type, flashes are only retained as prediction references if they occur very close to each other. Complexity filtering for the picture with local illumination changes can follow filtering for the picture with flashes. Within the picture, however, better quality should be allocated in principal to regions that retain the same luminance characteristics with past and future pictures. If picture j is a local illumination change and is used to derive the filtered complexity of a neighboring picture, then, similarly with the flash case, the filtering coefficient $w_j$ is decreased. In some implementations, the coefficient can be multiplied by a parameter that is not negative, but always less than one.

Camera Pan/Zoom

The complexity filtering method for global camera motion, which includes camera pan and zoom, highly resembles the discussion of the cross fades. For the global camera motion, a determination is made for the average complexity for the scenes before and after the camera motion. Assume, for example, that the camera motion starts from picture $l_1$ and finishes at picture $l_2$, and picture i belongs to the scene with camera motion. The weighting parameters are then modified as follows:

$$w_j = \begin{cases} \beta \times v_j, & \max(i-N, k_1)-i < j < \max(i-N, l_1)-i \\ \beta \times v_j, & \min(i+N, l_2)-i < j < \min(i+N, k_2)-i \\ \alpha \times v_j, & \max(i-N, l_1)-i \le j < \min(i+N, l_2)-i \\ 0, & \text{otherwise} \end{cases}.$$

Parameters $\alpha$ and $\beta$ can be selected such that the complexity of the camera motion can have more weight than the complexity of the two scenes that precede and follow the scene transition. Pictures belonging to the scenes at either side of the camera motion can be weighted with $\beta$, while pictures that belong to the camera motion can contribute more to the complexity determination for the current picture i. When a picture that is designated as belonging to a camera motion contributes to the complexity determination of neighboring pictures, pictures for which their complexity has not yet been filtered contribute their original complexity value while already complexity filtered pictures contribute their filtered complexity value.

Compared to filtering the complexity of fade transitions, which put more weight to the start and end scenes and not the transition pictures, here, the opposite approach can be adopted, in which the transition (camera motion) pictures can contribute more to the determination of the complexity ($\alpha>\beta$). Some examples of complexity filtering are illustrated in FIG. 10.

Figure 10:
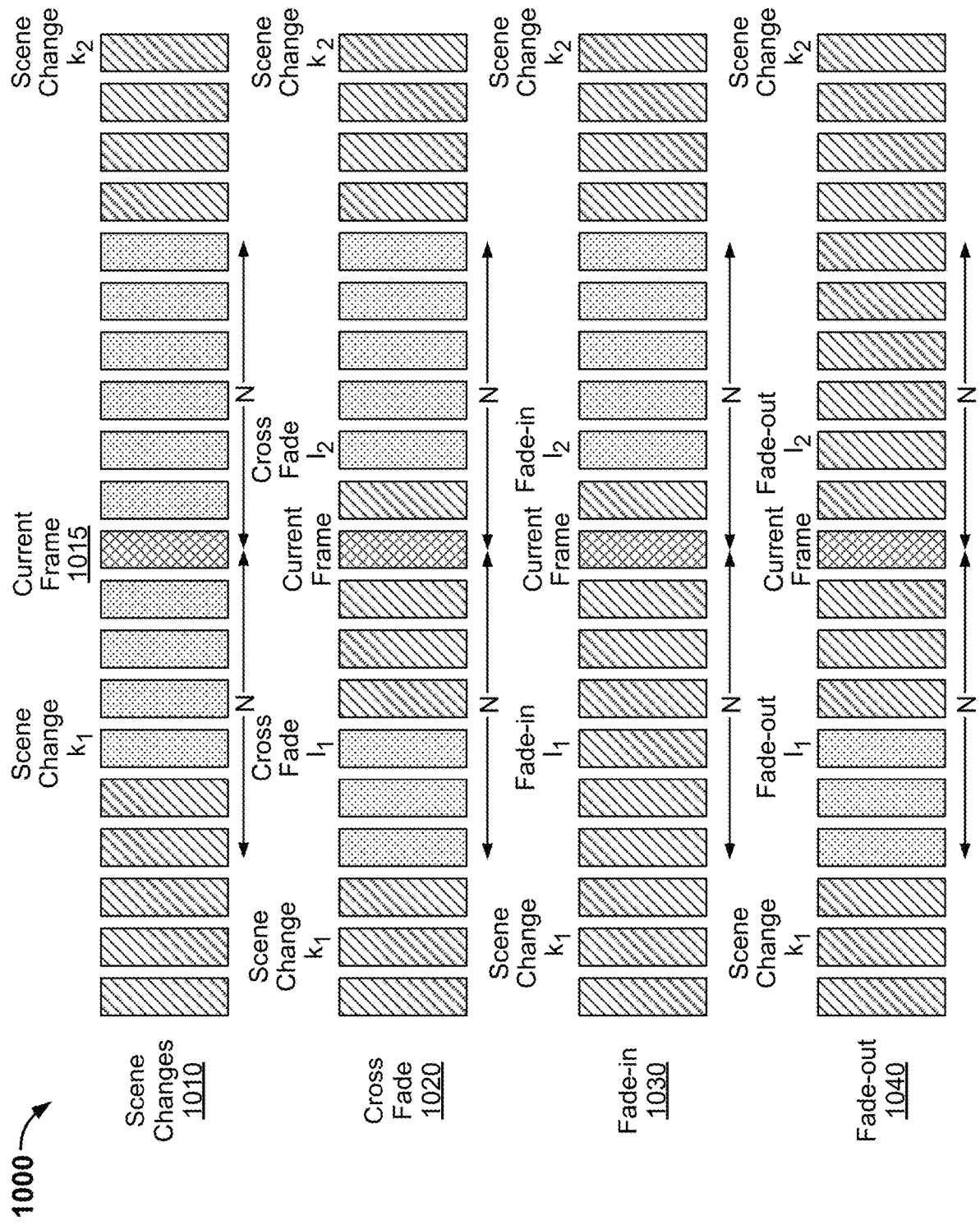
FIG. 10 depicts examples of frames for different scene types.

FIG. 10 shows examples of pictures for different scene types. In particular, FIG. 10 shows examples of pictures that are having their complexity filtered depending on the scene types. The scene types for the pictures shown are the scene changes 1010, the cross fade type 1020, the fade-in type 1030, and the fade-out type 1040. For each scene type, 1010, 1020, 1030, 1040, the darker pictures can contribute the most to the determination of complexity during complexity filtering for fade transitions. For example, for the case that only includes the scene changes type 1010, the current picture 1015 contributes the most to the determination of complexity.

Rate Allocation with Look-Ahead

A scheme is developed that can depend on the extent of the look-ahead for good compression performance. In general, the larger the look-ahead the better the compression performance. The scheme can perform rate estimation and allocation (e.g., sets the bit target) for each picture, and can then employ some arbitrary underlying rate control model to achieve the bit target. Additional coding passes can be used to ensure that these targets are met. The underlying rate control algorithm that selects the quantization parameter (QP) value for a given bit target can be any algorithm of this family, which can include the quadratic model and the rho-domain rate control model among others. Novel algorithms are disclosed here that can determine the bit target for each picture. The look-ahead information can come from an initial encoding pass, from a pre-analyzer that may perform motion estimation and compensation, or a combination thereof. This information can involve the complexities $c_i$ for each picture for which look-ahead is available, and for pictures that have already been coded. The complexities c; for each picture can involve the motion-compensated sum of absolute differences (SAD), or the SAD when weighted prediction is used, or some combination of temporal and spatial picture statistics. In some implementations, the SAD can be used with and without weighted prediction.

Motion estimation could utilize any algorithm, including block based and region based motion estimation, phase correlation, pel-recursive techniques, and the like, and a variety of motion models can be used including translational, affine, parametric, and others. The complete complexity determination can provide more information, as described previously. Two alternative rate allocation algorithms were designed and are described below.

Note that throughout this section, the term "predictive pictures" can refer to both uni-predictive and bi- and multi-hypothesis predictive pictures.

Rate Allocation with Look-Ahead—Algorithm 1

This algorithm/scheme is a novel rate allocation algorithm that can be dependent on having access to statistics and complexity measures of future pictures. The algorithm can yield the bit target for each picture. This algorithm does not have to select the coding parameters (e.g., QP) that will be used to code the picture. This selection can be the task of an underlying arbitrary rate control model, which takes the bit target as the input and yields the coding parameters. Algorithms that can be used for this arbitrary rate control model can include the quadratic model and the rho-domain rate control model, among others. In general, this algorithm could use any rate control as long as the rate control translates the bit target into a corresponding coding parameter set.

In some implementations, this algorithm may not use rate control, but can determine the number of bits per picture and, afterwards, any rate control algorithm can be used to map bits to coding parameters, such as QP values. The coding parameters can be fitted to achieve the desired bit rate target. Aspects of this algorithm can use a look-ahead window and the complexity of past pictures to make a determination as to how many bits should be assigned to the pictures. Further, the number of bits for a picture can be adjusted based on how other pictures were coded or will be coded.

In this algorithm, $n_{ref} > 0$ can denote the number of pictures for which look-ahead is available, and curr can denote the index of the current picture that is to be coded. The total complexity of the pictures in the look-ahead buffer may be determined as follows:

$$c_{total} = \sum_{i=curr}^{curr+n_{ref}} \hat{c}_i.$$

If a picture is inter-coded using previously coded pictures, e.g., P or B, then the original value of its complexity can be used during the summation. If, however, it is coded as an intra picture then the complexity of the next picture is used, and it is multiplied by a factor K, which in one possible embodiment can be set equal to 5. Thus, the term $\hat{c}_i$ is given as follows:

$$\hat{c}_i = \begin{cases} c_i, & \text{predictive picture} \\ K \times c_{i+1}, & \text{otherwise} \end{cases}.$$

The bits $bits_i$ allocated to an inter-coded picture are given by the following expression:

$$bits_{i,P} = \frac{c_i}{c_{total}} \times \frac{n_{ref} \times B_R}{N_R + s_n}.$$

where $B_R$ is the number of remaining bits from the total initial bit budget, $N_R$ is the number of pictures that have yet to be coded, and $s_n$ is a "safety net" designed to avoid over-starving the bit rate close to the end of the image sequence. In some embodiments, the value of the safety net could be set to 30. Hence, the bits allocated to a picture can be proportional to the ratio of its complexity over the total complexity, times the remaining bit budget that may be allocated to the look-ahead pictures. Finally, the number of the bits $bits_i$ allocated to an intra-coded picture can be given by the following expression:

$$bits_{i,I} = \frac{c_{i+1}}{c_{total}} \times \frac{n_{ref} \times B_R}{N_R + s_n}.$$

A notable exception can be a periodically-inserted intra-coded picture, in which case the QP used to code the picture is selected to be close to the QP used to code previous pictures. If a periodically inserted intra-coded picture coincides with a scene change, then the scene change classification can over-ride the periodicity classification, and the picture can be coded as a regular intra picture. In other cases, the bit target can be fed into a rate control model to yield the QP value. The picture can be encoded with that QP value and the encoder can then check the number of bits (e.g., bits_old) used to encode the picture. If they are different from the original target by more than a threshold, then a function called bits_new=normBits(bits_old, QP_OLD, QP_NEW) is iteratively used to yield the QP_NEW that would result to a bit usage closer to the original target. The picture can then be re-encoded using the new QP value. If PSNR constraints are used, then the picture may be re-encoded so that it satisfies the PSNR minimum and maximum constraints. An example diagram of the main loop of this algorithm is illustrated in FIG. 11, while an example diagram that illustrates the determination of the total complexity $c_{total}$ is shown in FIG. 12.

Figure 11:
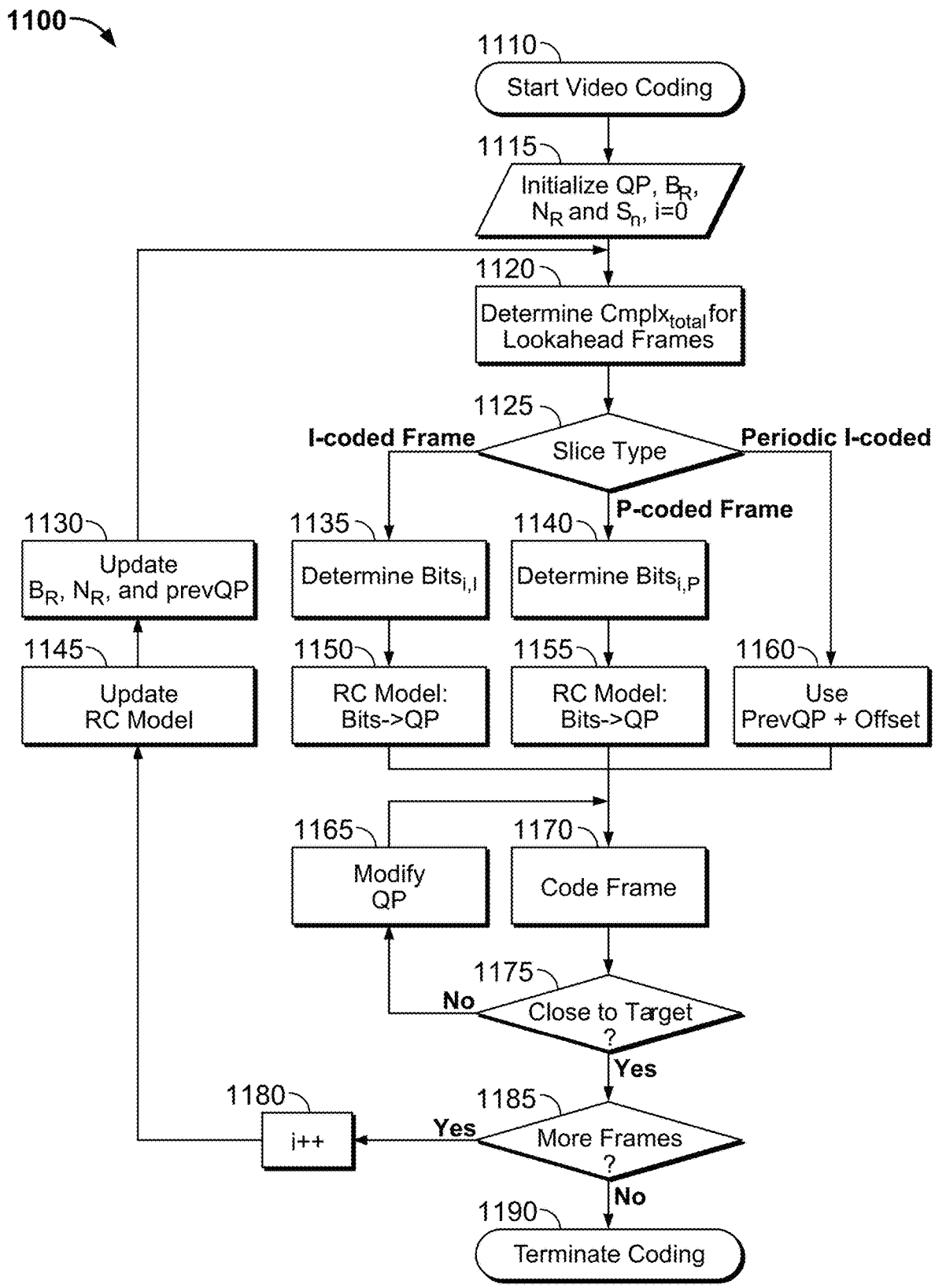
FIG. 11 depicts an example of a flow chart for the main loop of Algorithm 1 of the rate allocation with look-ahead technique.

FIG. 11 shows an example flow chart 1100 for the main loop of Algorithm 1 of the rate allocation with look-ahead technique. In FIG. 11, the coding starts of the video 1110 and initializations 1115 are performed for QP, $B_R$, $N_R$, and $S_n$ with i=0. The total complexity $c_{total}$ is determined for lookahead pictures 1120. Then the slice type is determined 1125, which can be an I-coded picture, a P-coded picture, or a periodic I-coded picture. If the slice type is an I-coded picture then the $bits_{i,I}$ are determined 1135 and an RC model of the bits yields the QP 1150. If the slice type is a P-coded picture then the $bits_{i,P}$ are determined 1140 and an RC model of the bits yields the QP 1155. If the slice type is the periodic I-coded type, then the previous QP, PrevQP, plus some offset is used 1160. The offset is determined similarly to factors (c)-(f) of the section titled: Coding Parameter Allocation for Hierarchical Prediction Structures. Afterwards, the picture is coded 1170. If the target is close 1175 then determine if there are more pictures 1185 for processing. If the target is not close, them modify the QP 1165 and code the picture again 1170. If there are no more pictures for coding, then coding can be terminated 1190. However, if there are more pictures then increment i (e.g., i++) 1180, update the RC model 1145, and update $B_R$, $N_R$, and prevQP 1130 before determining the total complexity $c_{total}$ for lookahead pictures 1120.

Figure 12:
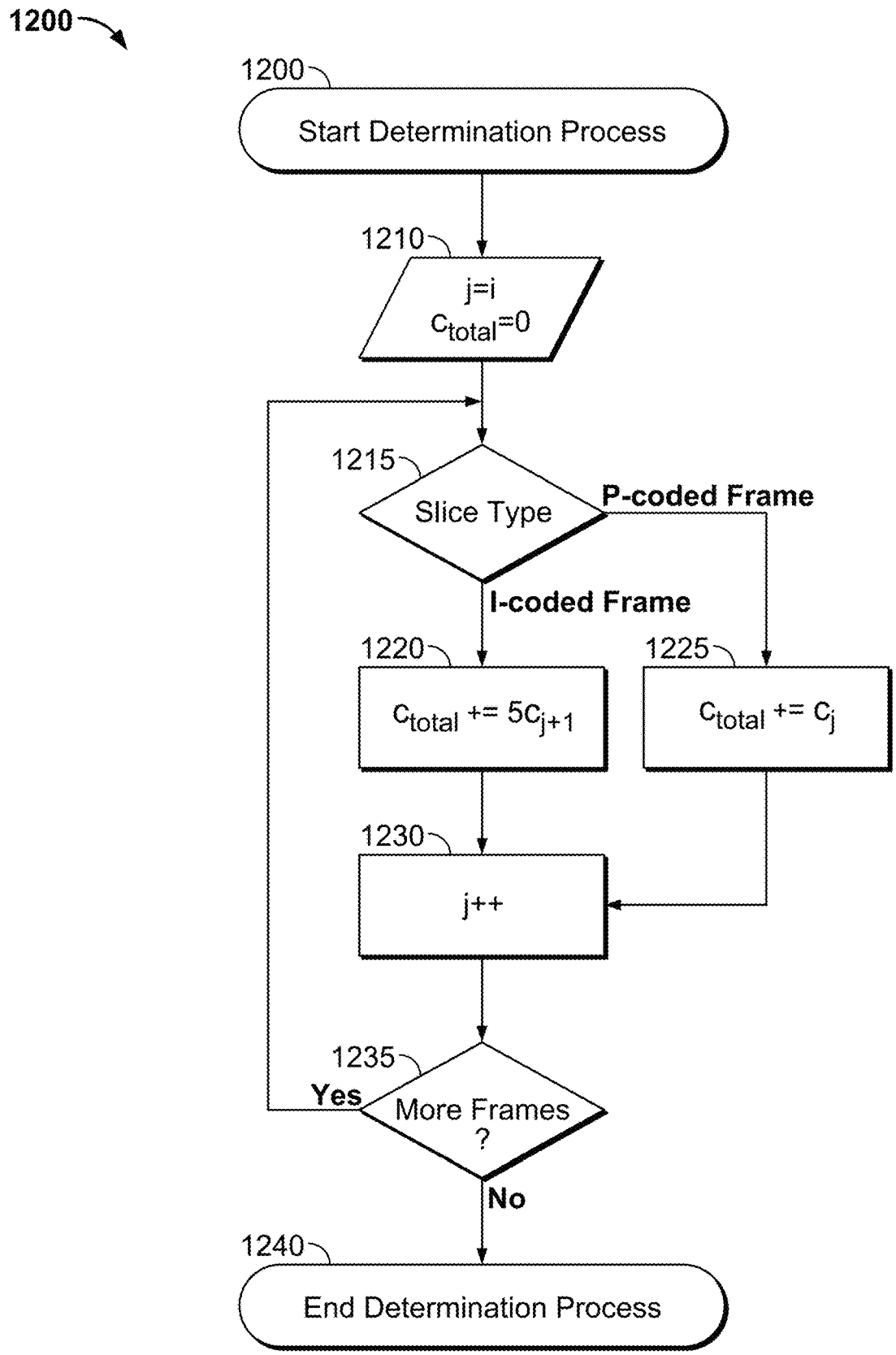
FIG. 12 depicts a flow chart for an example of the total complexity $c_{total}$ of Algorithm 1 of the rate allocation with look-ahead technique.

FIG. 12 shows an example flow chart 1200 for determining the total complexity $c_{total}$ of Algorithm 1 of the rate allocation with look-ahead technique. In FIG. 12, the process can begin 1200 and parameters are set 1210 for j=1 and $c_{total}$=0. Then the slice type is determined 1215 for P-coded pictures and I-coded pictures. If there is a P-coded picture, then $c_{total}$+=$c_j$ 1225. If there is an I-coded picture then $c_{total}$+=5×$c_{j+1}$ 1220. The parameter of j is incremented 1230 after the determination of $c_{total}$. If there are more pictures 1235 then the slice type is determined for the next picture 1215. If there are no more pictures 1235 then the process is terminated 1240.

Rate Allocation with Look-Ahead-Algorithm 2

This algorithm has similarities with Algorithm 1 for the rate allocation with look ahead. Algorithm 2 for the rate allocation with look ahead can employ complexity estimates that include information from the future. Aspects of this second algorithm can take into account pictures that are not being predicted rom other pictures.

This scheme, although quite similar to the scheme in the previous section, has several differences, which are now described. The sum of the complexity of pictures in the look-ahead buffer that are not coded as intra-coded pictures can be determined as follows:

$$c_{total} = \sum_{i=curr, i \notin INTRA}^{curr+n_{ref}} c_i.$$

The total complexity here can include complexity values of all pictures that were not coded as intra-coded pictures. The main difference of this algorithm compared to Algorithm 1 described above is the need to estimate the number of bits that will be allocated to encode the intra-coded pictures. This estimate can be determined as follows for all intra-coded pictures:

$$b_{total}^{INTRA} = \sum_{i \in INTRA} normBits(w \times h \times (\alpha_i \times var_i + \beta_i), QP_{NORM}, QP_{AVE}).$$

The function normBits( ) has already been described previously. The parameter w can denote the width of the picture, and h can denote the height of the picture. $QP_{NORM}$ can represent a fixed QP value, e.g., 24 in one possible embodiment, for which, the coefficients $\alpha$ and $\beta$ of the linear model can be determined using statistics from previous intra-coded pictures through linear regression. A reason the coefficients are indexed according to the picture is because those coefficients are updated, and hence their value can vary. To account for different statistics between scenes, different sets of coefficients can be used for scene changes and different sets can be used for periodic intra-coded pictures.

The bits $bits_i$ allocated to an inter-coded picture are given by the following expression:

$$bits_i = \frac{c_i}{c_{total}} \times \left( \frac{n_{ref} \times B_R}{N_R + s_n} - b_{total}^{INTRA} \right).$$

Hence, the bits allocated to an inter-coded picture are proportional to the ratio of its complexity over the total complexity, times the remaining bit budget that may be allocated to the look-ahead pictures, minus the estimate of the bits that will be allocated to the intra-coded pictures.

In contrast to the previous algorithm, the bits allocated to code an intra-coded picture are now determined with the help of the linear model, and are given below:

$$bits_i = normBits(w \times h \times (\alpha_i \times var_i + \beta_i), QP_{NORM}, QP_{AVE}).$$

Periodically inserted intra-coded pictures are handled similarly with Algorithm 1 above. An example flow chart of the main loop of this algorithm is illustrated in FIG. 13, while an example flow chart that illustrates the determination of the total complexity $c_{total}$ is shown in FIG. 14.

Figure 13:
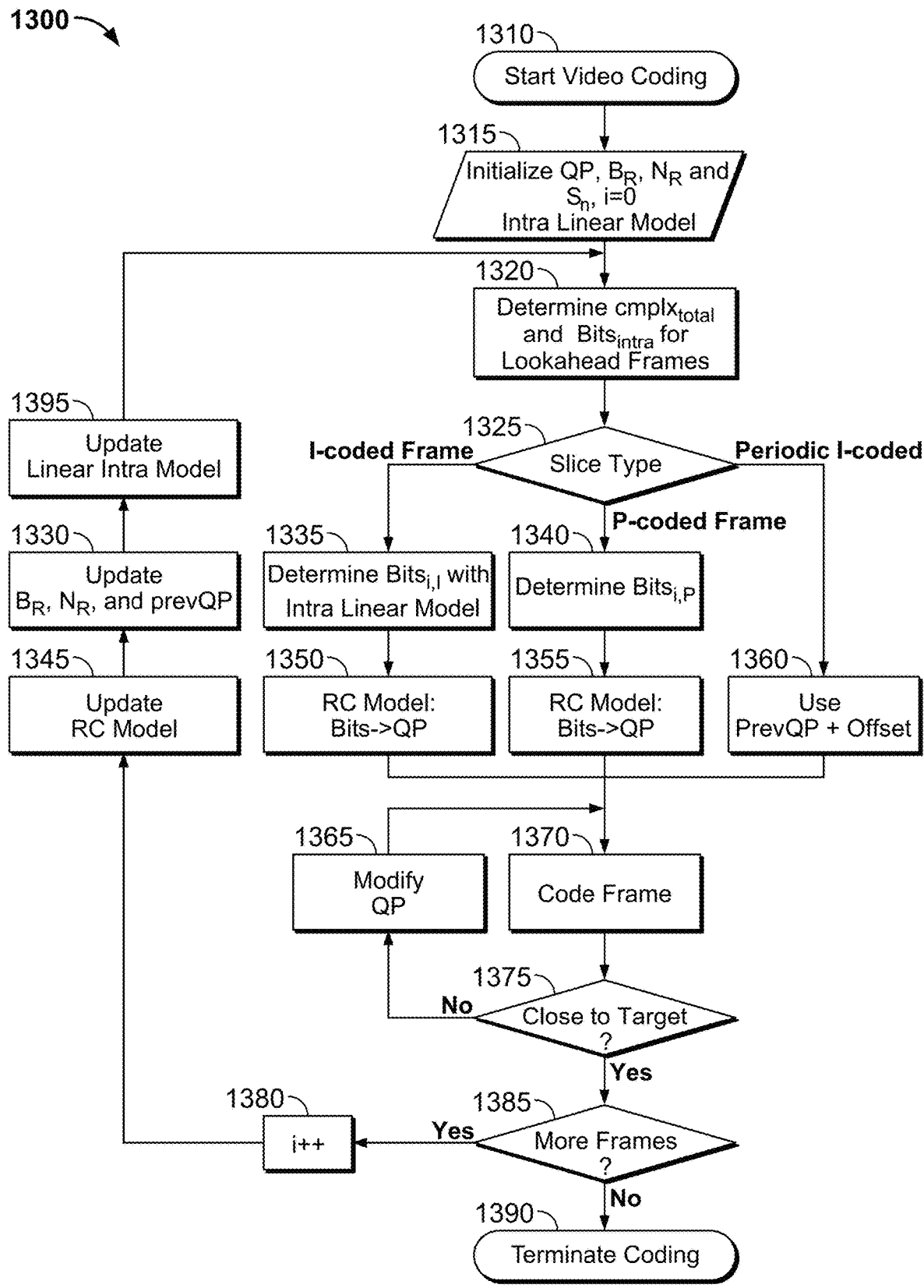
FIG. 13 depicts a flow chart for an example of the main loop of Algorithm 2 of the rate allocation with look-ahead technique.

FIG. 13 shows an example flow chart 1300 for the main loop of Algorithm 2 of the rate allocation with look-ahead technique. In FIG. 13, the coding starts of the video 1310 and initializations 1315 are performed for QP, $B_R$, $N_R$, and $S_n$ with i=0 with the intra linear model. A determination is made for the total complexity $c_{total}$ and $bits_{intra}$ for lookahead pictures 1320. Then the slice type is determined 1325, which can be an I-coded picture, a P-coded picture, or a periodic I-coded picture. If the slice type is an I-coded picture then the $bits_{i,I}$ are determined with the intra linear model 1335 and an RC model of the bits yields the QP 1350. If the slice type is a P-coded picture then the $bits_{i,P}$ are determined 1340 and an RC model of the bits yields the QP 1355. If the slice type is the periodic I-coded type, then the previous QP, PrevQP, plus some offset is used 1360. The offset is determined similarly as factors (c)-(f) of the section titled: Coding Parameter Allocation for Hierarchical Prediction Structures. Afterwards, the picture is coded 1370. If the target is close 1375 then it can be determined if there are more pictures 1385 for processing. If the target is not close, them the QP 1365 is modified and the picture is coded again 1370. If there are no more pictures for coding, then coding can be terminated 1390. However, if there are more pictures then i is incremented (e.g., i++) 1380, the RC model is updated 1345, and parameters $B_R$, $N_R$, prevQP 1330, the linear intra model 1395 before determining the $bits_{intra}$ and the total complexity $c_{total}$ for lookahead pictures 1320 are also updated.

Figure 14:
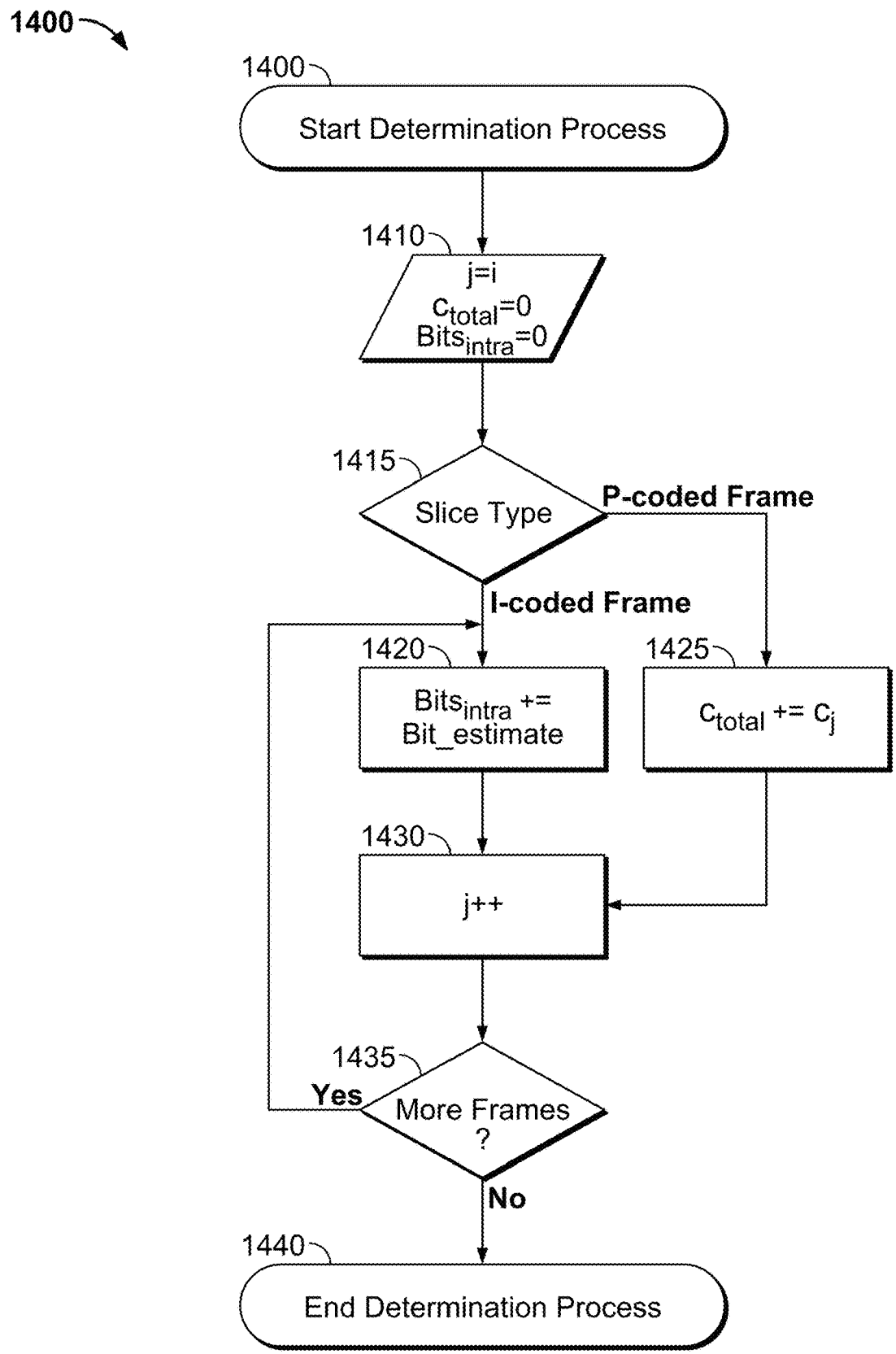
FIG. 14 depicts a flow chart for an example of the total complexity $c_{total}$ and $bits_{intra}$ of Algorithm 2 of the rate allocation with the look-ahead technique.

FIG. 14 shows an example flow chart 1400 for the process of determining of $bits_{intra}$ and total complexity $c_{total}$ of Algorithm 2 of the rate allocation with the look-ahead technique. In FIG. 14, the process can begin 1400 and parameters are set 1410 for j=1, $c_{total}$=0, and $bits_{intra}$=0. Then the slice type is determined 1415 for P-coded pictures and I-coded pictures. If there is a P-coded picture, then $c_{total}$+=$c_j$ 1425. If there is an I-coded picture then $bits_{intra}$+=bit_estimate 1420. The term bit_estimate is determined as described above using the normBits function. The parameter of j is incremented 1430 after the determination of $bits_{intra}$ or $c_{total}$. If there are more pictures 1435 then for an I-coded picture, $bits_{intra}$+=bit_estimate 1420. If there are no more pictures 1435 then the process is terminated 1440.

The average bit rate control algorithms (see e.g., sections on high-complexity and low complexity ABR rate control with look ahead) can perform both rate allocation and rate control, and can benefit from both future and previous pictures information.

While Algorithms 1 and 2 for rate allocation with look-ahead can achieve a global target by adjusting locally how many bits will be allocated, these additional algorithms that belong to a second family of algorithms can have and achieve a global target without having to explicitly specify a number of bits for a picture. As described below, these algorithms can work to "smooth" the quality between pictures to avoid undesired visual artifacts and visual quality fluctuation among pictures. These algorithms can allocate coding parameters to achieve the total bit rate targets without having to necessarily achieve bit targets for every picture. Hence, the algorithms described below are less granular in the bit domain than algorithms of the first family. In other words, Algorithm 1 and 2 of the first family of algorithms can operate more in the bit domain (e.g., concerned with bit rate), and the algorithms described below can operate more in the quality domain (e.g., concerned with distortion). In general, all of the algorithms described in this disclosure benefit from estimated and filtered measures of picture complexity.

Like algorithms of the first family, the algorithms below can obtain target bit rates by using the statistics from previous coded pictures, but there can be higher complexity in some implementations for the algorithms below (see e.g., section for high-complexity ABR rate control with lookahead). In some implementations, average bit rate algorithms in general can have some similarities, such as how QP values are used. The look-ahead for these algorithms can be down to zero (e.g., only past picture statistics are used). If only past statistics are used then these statistics can be used to perform an estimate and predict future statistics. The past information can be from the beginning of the sequence or consider only a constrained, moving window that only uses a certain number of pictures from within the sequence that are relatively close to the current picture. Further, different amounts of quality can be allocated for different parts of an image sequence in some implementations.

High-Complexity ABR Rate Control with Look-Ahead

The High-Complexity ABR Rate Control with Look-Ahead rate control algorithm can draw ideas from two-pass rate control algorithms, as well as from average-bit-rate (ABR) rate control algorithms that may be similar to the algorithm included in many open source video coders (e.g., x264 H.264/AVC, Xvid MPEG-4, FFMPEG MPEG-4, etc.). This algorithm can conduct the rate allocation and can select the coding parameters, such as the quantization parameter QP, for the current picture. One basic premise of this algorithm is that it can collect coding statistics for all previous pictures and then the coding parameters or parameter, such as the QP value, can be selected for the current picture. Assuming that the coding parameter is the QP, this coding parameter is set as a base QP value plus a modifier. The QP value plus the modifier is selected to achieve the target bit rate for all previously coded pictures, including the current one. The base QP value can be equivalent to the QP value that would have been expected to achieve the target bit rate if it had been applied to all pictures coded so far. This process can be applied for all other possible coding parameters such as lagrangian parameters, coding modes, thresholding and quantization rounding, etc. The detailed description of the algorithm follows.

The parameter curr can denote the index of the picture that is to be coded. The bits target $bits_{target}$ for all pictures coded so far is determined as follows:

$$bits_{target} = \sum_{i=0}^{curr} \left( w_{curr,i} \times \frac{bit\_rate}{frame\_rate} \right).$$

The weights $w_{j,i}$ can vary for each picture so that better quality/higher bit rate can be afforded to specific pictures. Furthermore, the weights can vary in time; hence, there is a double index for the weights. For example, pictures that were detected as flashes can receive a lower weight. For example, these varying weights can be used to do the following:

afford greater quality to more sensitive parts of the image sequence, such as the beginning;

vary the bit rate allocation according to the complexity measures; and adjust the bit rate to the particular coding tools and hierarchical structures being used.

Two constraints are that, on average, curr should be greater than some threshold, and the sum of these coefficients should add up to curr. That is $$\sum_{i=0}^{curr} w_{curr,i} = curr.$$

With this technique, the bit rate target can be enforced. The coefficients $w_{j,i}$ may vary in time, as noted above.

In some implementations, when picture N is being coded, there can be a calculated sum of the coefficients $w_{j,i}$ from 0 through N–M, where M>0, is equal to K. At the same time, when picture N+P is being coded, where P>0, it is possible that coefficients 0 through N–M sum to L #K. In this algorithm, this feature can allow, in some embodiments, subtle injections of additional bit rate for certain scenes or pictures, while at the same time, the bit target is achieved, and other areas are not visibly starved of bits. After each picture has been coded, this technique can determine a rate factor f, which is used to divide the complexity of the current picture to yield the quantization parameter. Values can be evaluated for the rate factor between $f_{start}$ and $f_{end}$. In some embodiments, the rate factor f can be found by minimizing the absolute difference between the bit target and the bits bits(f) that would have been spent so far if factor f had been used to obtain the respective QPs. The following expression can illustrate this minimization:

$$f_{curr} = \arg\min_{f \in (f_{start}, f_{end})} |bits_{target} - bits_{curr}(f)|.$$

Dividing the complexity value of a picture, which may be optionally set to the power of some pre-defined parameter, with this factor can yield the quantization step size, which is then converted into a quantization parameter using an additional function.

The term bits(f) is determined through a comprehensive process that is now described. The pictures that have been coded so far are divided into pictures belonging to the highest priority level, and pictures that do not belong to that level are considered as lower priority pictures. For each coded picture there are many coding statistics available, such as the motion compensation complexity, the bits used to code the slice headers and texture, the QP used to code the picture, etc. This past coding information together with the new QP, which is obtained by dividing the complexity by the factor f can now be used to estimate the bits that would have been spent to code that picture if the new QP was used in place of the QP that was actually used to code that picture. A determination of this bit estimate can include a summation, and can be made for every coded picture that belongs to the level currently being coded (e.g., in this case the highest priority level). A similar process can then be applied for the bit estimate of previously coded lower priority pictures.

One main difference compared to the process used for the highest level pictures is the derivation of the new QP. For example, the new QP can depend on the QP that will be used to code the neighboring anchor pictures, and can be offset by a parameter that can depend on a variety of factors (e.g., these factors are described in the following section for the Coding Parameter Allocation for Hierarchical Prediction Structures).

In some embodiments, term bits(f) can be written down as follows:

$$\text{bits}_{curr}(f) = \sum_{i=0, i \notin B\_SLICE}^{curr} NBQ\left(t_i, h_i, QP2QStep(QP_i), \frac{c_i^e}{f}, s_i\right) + \sum_{i=0, i \in B\_SLICE}^{curr} NBQ\left(t_i, h_i, QP2QStep(QP_i), QP2Qstep\left(QStep2QP\left(\max\left(\frac{c_{L0(i)}^e}{f}, \frac{c_{L1(i)}^e}{f}\right)\right) + B_{offset,i}\right), s_i\right),$$

where $t_i$ is the number of texture bits used for picture i and hi is the number of header bits used for picture i. QP2QStep( ) is a function that translates a QP (logarithmic scale) value to a quantization step (linear scale) value, QStep2QP( ) does the inverse, $QP_i$ is the QP value used to encode picture i, and $c_i$ is the complexity of picture i.

When picture i is a lower priority picture, then L0(i) can denote the temporally closest picture to i that belongs to the highest priority level, and L1(i) can denote the second closest picture that belongs to the highest priority level. Terms $c_{L0(i)}$ and CLI(i) represent the complexity values of these pictures. The parameter $B_{offset,i}$ represents the QP offset applied to a B-coded picture that depends on whether the picture is used as a reference, among other factors. The derivation of parameter $B_{offset,i}$ is described in detail in the following section for the Coding Parameter Allocation for Hierarchical Prediction Structures. The term si denotes the number of skipped macroblocks for coded picture i. Finally, term e denotes an exponent that is used to avoid large QP fluctuations. In some embodiments, e is set to 0.4 and the constraint $0 \le e \le 1$ is imposed. The function NBQ( ) can be any function that uses coding statistics and parameters of a previously coded picture, and then calculates an estimate of the bit usage, if those coding parameters were altered. In some embodiments, the function NBQ( ) can have the following output:

$$NBQ(a, b, q, d, e) = \begin{cases} a \times \left(\frac{q}{d}\right)^{\alpha} + b \times \left(\frac{q}{d}\right)^{\beta}, & s_i < \gamma \times \left(\frac{w \times h}{\text{block\_pixels}}\right) \\ a \times \left(\frac{q}{d}\right)^{\alpha} + b, & \text{otherwise} \end{cases}$$

For this embodiment, parameter $\alpha$ can be set to a value slightly greater than one, while parameter $\beta$ can be set to a value less than one. The parameter block_pixels corresponds to the number of pixels that constitute a block for motion compensation. The value of these parameters can be set in such a way so that, although texture bits (a) can increase significantly with decreasing QP, the header bits (b) can increase with a slower rate. Parameter $\gamma$ can be greater than zero and smaller than one, and should be set to a large value. After the rate factor f has been determined for the current picture, a determination can be made for the term $QP_{mod}$, which is used to ensure that the rate control achieves the original bit target. The number of the bits used $\text{bits}_{used}$ can be calculated as the sum of the bits used for the start of the picture through and including the end of the picture. Even though, in some implementations, the start can be set to 0 and end to curr, the index of the current picture, these settings are optional. It is possible to determine the bit usage over some window. This can facilitate allocating different bit rates in different parts of the image sequence. This can be expressed as follows:

$$\text{bits}_{used} = \sum_{i=start}^{end} b_i.$$

In this expression, the term b; can refer to the number of bits used to code picture i.

After factor f has been estimated, an additional parameter can be determined that addresses over-utilization or under-utilization of the bit budget. This parameter, which can be referred to as the QP modifier, can increase when the bits are over-utilized, and can decrease when the bits are under-utilized and, in general, can maintain a value close to zero when the bit target is being satisfied. The QP modifier parameter can be added to the initial QP estimate that is obtained by dividing the power of the complexity by the factor. In some embodiments, the QP modifier $QP_{mod}$ is given by the following expression:

$$QP_{mod} = \left(\frac{\text{bits}_{used} - \text{bits}_{total}}{0.02 \times \text{bits}_{total}}\right)^Z,$$

where Z is an exponent that can take different values at the beginning and end of the sequence (to ensure slower and faster convergence to the bit target, respectively). For the most part of the image sequence, Z can have a value slightly greater than one. This method includes the costly calculation of the rate factor f that has to be performed for each picture that belongs to the highest priority level. The final QP used to encode the current picture is given below:

$$QP_{curr} = \begin{cases} QP_{mod} + QStep2QP\left(\frac{c_{curr}^e}{f}\right), & \text{level} = 0 \\ \max(QP_{L0(curr)}, QP_{L1(curr)}) + B_{offset,curr}, & \text{level} > 0 \end{cases}.$$

The QP allocated to pictures at level 0 can be a function of their complexity metric and the factor f, which can then be scaled by the QP modifier in order to achieve the target bit rate. The QPs allocated to pictures in lower priority levels can be a function of the QPs that were allocated to level 0 pictures, from which the lower priority pictures are predicted and are dependent. These QPs can be further modified with parameter $B_{offset,i}$ that is described in detail in the following section for Coding Parameter Allocation for Hierarchical Prediction Structures.

When a periodically intra-coded picture is inserted, which was not previously classified using some algorithm as a scene change, the QP of that picture can be obtained by adding a positive or negative modifier to the quantizer parameter q that was used to code the closest level 0 picture. This modifier can depend on the value of q itself, the encoder and decoder buffer fullness, and the complexity of the content being coded. If the bit rate constraints can be relaxed, it would be desirable to avoid visual quality degradation due to coding the same content very poorly or too well. A diagram of this algorithm is illustrated in FIG. 15.

Figure 15:
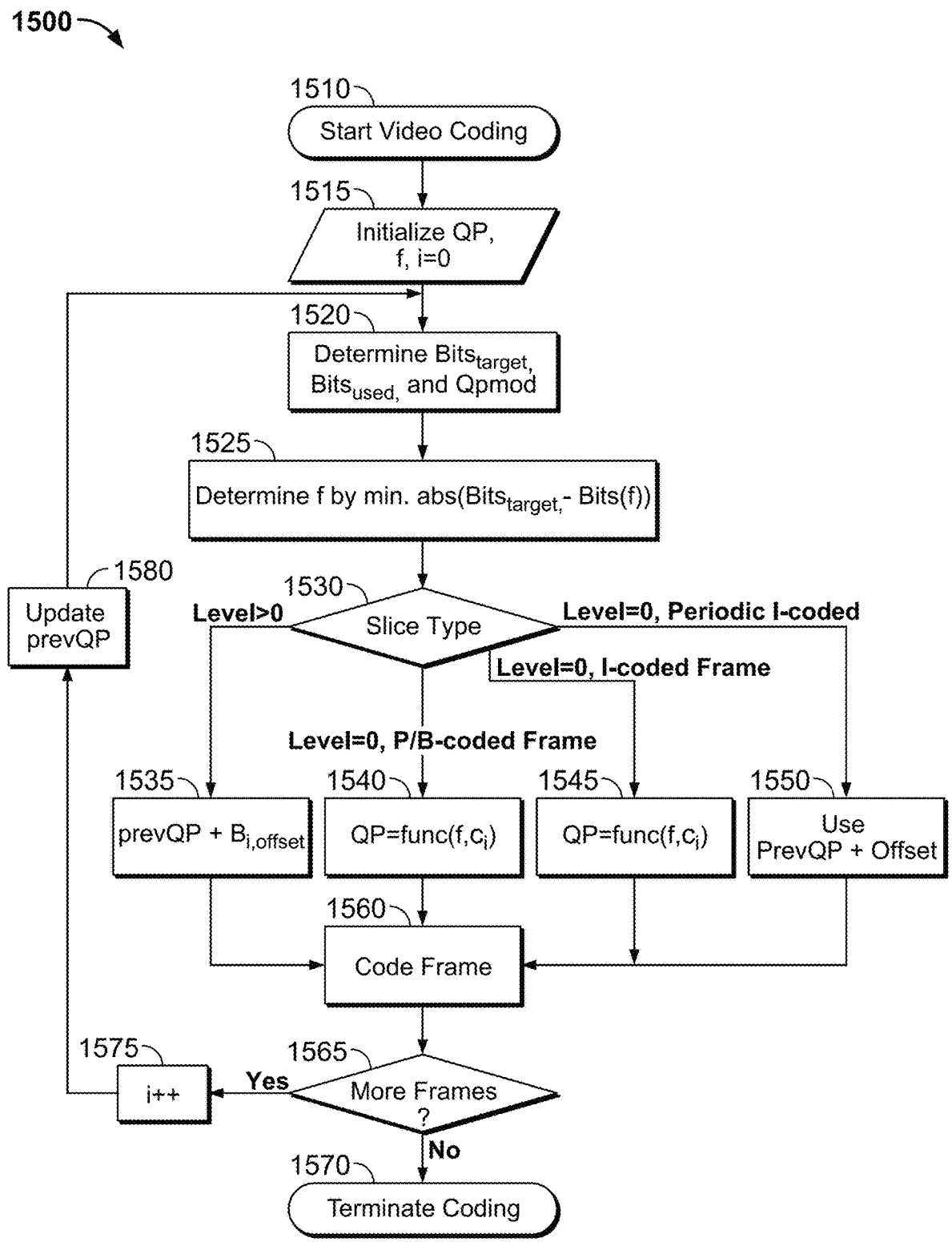
FIG. 15 depicts a flow chart of an example of an algorithm for a high complexity ABR rate control with look-ahead.

FIG. 15 shows an example flow chart 1500 for an algorithm for a high complexity ABR rate control with look-ahead. In FIG. 15, the video coding begins at 1510 and the parameters are initialized at 1515 with QP, f, and i=0. The determination step 1520 is then performed for bits$_{target}$, bits$_{used}$, and Qp mod. Then, a determination step 1525 is conducted for f by minimum abs(bits$_{target}$-bits(f)). Afterwards, the slice type can be determined 1530. If the level>0, then prevQP+B$_{i,offset}$ 1535 is determined. Otherwise, if the slice type is a P- or B-coded picture, then QP=func(f,c$_i$) 1540. If the slice type is an I-coded picture, then QP=func (f,c$_i$) 1545. If the slice type is a periodic I-coded picture, then use the PrevQP plus some offset 1550. The offset is determined similarly to factors (c)-(f) of the section titled: Coding Parameter Allocation for Hierarchical Prediction Structures. After these are determined for a given slice type, the picture is coded 1560. If there are no more pictures 1565, then coding is terminated 1570. If there are more pictures 1565, then i is incremented (e.g., i++) 1575, and the prevQP is updated 1580 before the determination step 1520 is conducted for bits$_{target}$, bits$_{used}$, and Qp mod.

Aspects of the above description for the high complexity ABR rate control with look ahead can assume that there are practically no encoder or decoder buffering constraints for constant bit rate (CBR) or variable bit rate (VBR) applications. For those applications where buffering constraints are critical, the rate factor f can be modified given the buffer fullness at the encoder and the decoder. A small f can bias towards large QPs and fewer coded bits, while a larger f can result in more coded bits. If the bit usage is leading to a buffer overflow or underflow, then the factor f can be adjusted accordingly in order to compensate and keep the buffer fullness in a desirable state. Furthermore, the selected coding parameters can be used in conjunction with some rate control model to estimate the number of resulting bits, and to adjust those coding parameters so that encoder and decoder buffer constraints are met.

Low Complexity ABR Rate Control with Look Ahead

The rate control algorithm for the low complexity ABR rate control with look ahead can share some of the same aspects as the high complexity single-pass rate control algorithm described above, with higher simplicity in its implementation. The discussion and derivation of bits$_{used}$ and bits$_{target}$ can be identical or similar to the high complexity single-pass rate control algorithm described above. One difference in this algorithm is the derivation of the factor f.

The determination of the factor f is here facilitated with the help of a variable called the sum of complexity sum$_{cmplx}$. This quantity may be initialized to a value that is close to zero and sum$_{cmplx}$ may depend on the size of the image. In some embodiments, sum$_{cmplx}$ can be initialized as follows:

$$sum_{cmplx,-1} = \delta \times (\varepsilon)^{1-e} \times \left(\frac{w \times h}{block\_pixels}\right)^{\varsigma}.$$

In some embodiments, parameter δ can take values smaller than one, parameter ε can be proportional to 4-5 times the average bits allocated to each picture, and parameter ζ can be slightly larger than one. Parameters w and h can refer to the width and height of the picture, while the number block_pixels can represent the number of pixels in a block.

To determine the sum of complexity, the complexity measure of the last coded picture is stored at level 0, which is set as follows:

$$cmplx_{last}=c_i^e.$$

In addition to updating the above quantity, after each picture is coded, the sum of (weighted) complexity can be updated as follows:

$$sum_{cmplx,i} = sum_{cmplx,-1} + \sum_{j=0}^{i}(u_{j,i} \times cmplx_j).$$

The weights $u_{j,i}$, may vary for each picture so that more bits can be allocated to specific pictures. Furthermore, the weights can vary in time; hence, the double index is employed.

Pictures that were detected as flashes can receive a lower weight. These varying weights can also be useful when using hierarchical coding structures with arbitrary coding orders. The complexity parameter for the current picture cmplx$_i$ can be proportional to the number of bits used to code the picture times the quantization step size used to code the picture, and divided by the complexity of the last coded picture at level 0. The complexity of the last coded picture at level 0 can be weighted with the factor F to account for the current priority level. In some embodiments, the complexity parameter for the current picture cmplx$_i$ can be expressed as follows:

$$cmplx_i = \frac{bits_i \times QP2QStep(QP_i)}{F \times cmplx_{last}},$$

where the factor F depends on whether the picture belongs to the highest priority level, and if not, on the modifier that is applied to determine its quantization parameter. In some embodiments F can be selected as follows:

$$F = \begin{cases} 1, & level = 0 \\ 1.225^{B_{offset,i}}, & level > 0 \end{cases}.$$

As noted, a main difference between this algorithm and the previous algorithm for the high complexity ABR rate control algorithm includes the determination of the rate factor f, which is greatly simplified for this algorithm:

$$f = \frac{bits_{target}}{sum_{cmplx,i-1}}.$$

Furthermore, similar to the algorithm for the high complexity ABR rate control algorithm, there is an additional mechanism that can modify the QP allocation in order to achieve the bit rate target. A factor called an "overflow" can be determined, which can take values below one when bits are under-utilized and values greater than one when bits are over-utilized. In some embodiments, this factor is determined with the following methodology. The value of the buffer parameter can be expressed as:

$$\text{buffer} = t \times \text{bit\_rate} \times v_j,$$

where bit_rate is the target bit rate for the current segment of the image sequence. Parameter t refers to a control parameter that can result in trade-offs between coding efficiency and rate control accuracy. If t is large, then higher priority is placed in quality (e.g., quality increases), while bit target may not be accurately achieved. On the other hand, if t is small, higher priority is placed on bit rate compared to quality. When t is small, this can enable high rate control accuracy with, potentially, a loss in coding efficiency. Parameter $v_j$ is used to control the QP allocation so that buffer or quality constraints are satisfied. These operations can yield the following factor:

$$\text{overflow} = dClip3\left(o_{min}, o_{max}, 1.0 + \frac{\text{bits}_{used} - \text{bits}_{target}}{\text{buffer}}\right).$$

The overflow parameter can be constrained to be between $o_{min}$ and $o_{max}$, which can be less than one and positive, and greater than one, respectively. Finally, the QP that can be used to encode the current picture can be obtained similar to the section for the high-complexity ABR rate control, as follows:

$$QP_{curr} = \begin{cases} QStep2QP\left(\text{overflow} \times \frac{c_i^e}{f}\right), & \text{level} = 0 \\ \max(QP_{curr,L0}, QP_{curr,L1}) + B_{offset,curr}, & \text{level} > 0 \end{cases}.$$

The handling of periodically-inserted intra-coded pictures can be identical to the relevant discussion in the section for the high-complexity ABR rate control.

Compared to some algorithms, the algorithm described in this section can be more biased in allocating more bits at sensitive parts of the image sequence. Furthermore, the algorithm in this section can also incorporate rate adaptation to allocate additional bits on pictures that are deemed important for subsequent pictures. All these above features are also applicable for all previous algorithms in this disclosure. An example diagram of this algorithm is illustrated in FIG. 16.

Figure 16:
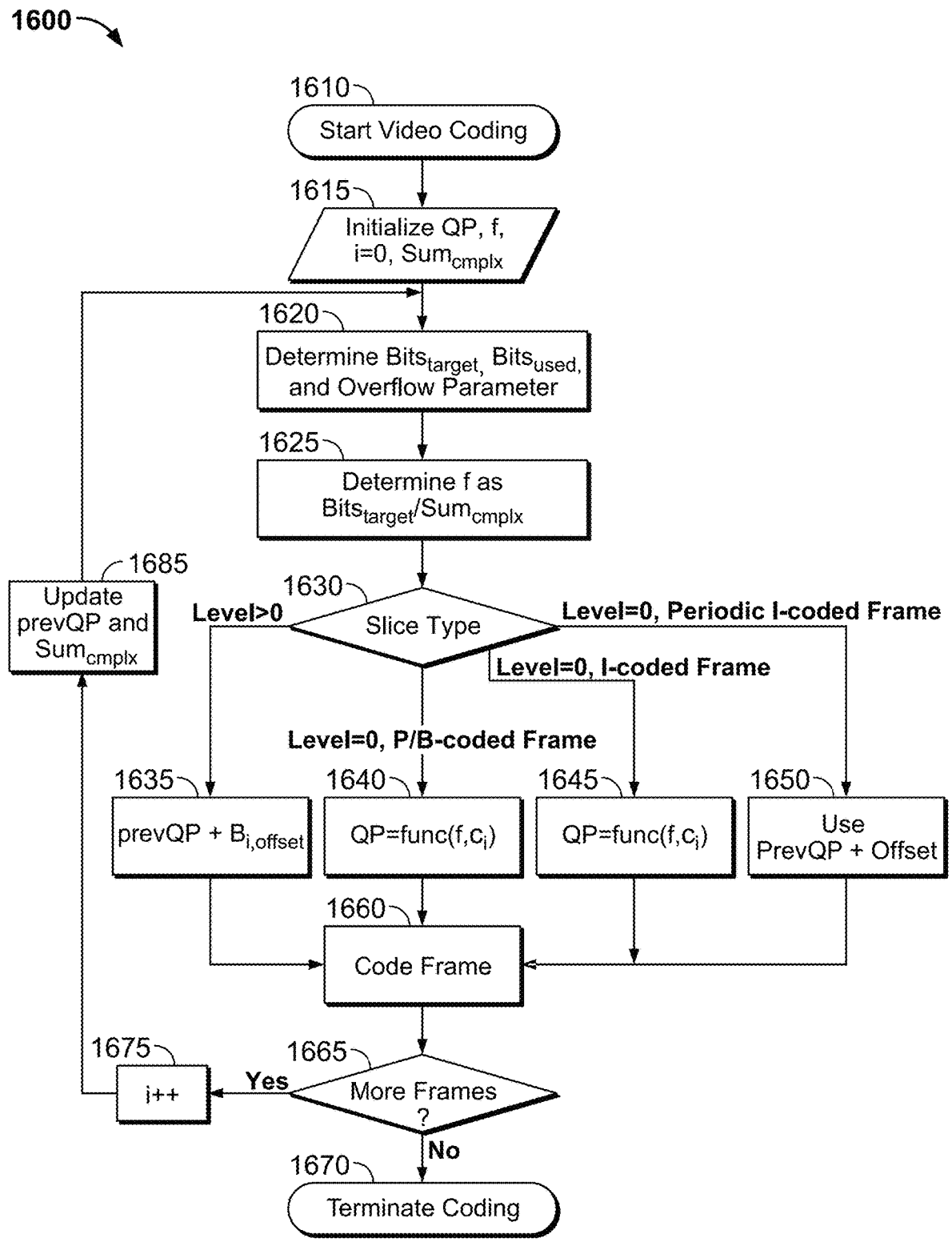
FIG. 16 depicts a flow chart of an example of an algorithm for a low complexity ABR rate control with look-ahead.

FIG. 16 shows an example flow chart 1600 for a low complexity ABR rate control algorithm with look ahead. In FIG. 16, video coding is started 1610 and the parameters are initialized 1615 for QP, f, i=0, and sum$_{cmplx}$. A determination step 1620 is conducted for bits$_{target}$, bits used and the overflow parameter. Then, f is determined 1625 as bits$_{target}$/sum$_{cmplx}$. Afterwards, the slice type is determined 1630. If the level>0 then prevQP+B$_{i,offset}$ 1635. Otherwise, if a P- or B-coded slice is determined as the slice type 1630, then QP=func(f,c$_i$) 1640. If an I-coded slice is determined, then QP=func(f, c$_i$) 1645. If a periodic I-coded picture is determined, then use PrevQP plus some offset 1650. The offset can be determined similarly to factors (c)-(f) of the section titled: Coding Parameter Allocation for Hierarchical Prediction Structures. After at least one of these operations 1635, 1640, 1645, 1650, the picture is coded 1660. If there are no more pictures 1665, then coding is terminated 1670. However, if there are more pictures 1665, then i is incremented (e.g., i++) 1675, and the prevQP and the sum$_{cmplx}$ are updated 1685 before a determination step 1620 is performed for bits$_{target}$, bits$_{used}$ and the overflow parameter.

The above description can assume that there are practically no encoder or decoder buffering constraints for constant bit rate (CBR) or variable bit rate (VBR) applications. For those applications where buffering constraints are critical, the rate factor f can be modified given the buffer fullness at the encoder and the decoder. A small f can bias towards large QPs and fewer coded bits, while a larger f can result in more coded bits. If the bit usage is leading to a buffer overflow or underflow, then the factor f can be adjusted accordingly in order to compensate and keep the buffer fullness in a desirable state. Furthermore, the selected coding parameters can be used in conjunction with some rate control model to estimate the number of resulting bits, and to adjust those coding parameters so that encoder and decoder buffer constraints are met.

Coding Parameter Allocation for Hierarchical Prediction Structures

When disposable pictures (e.g., pictures not buffered to be used as motion-compensation references) or pictures with lower priority are used, extra care may need to be taken in order to efficiently select the coding parameters. Fewer bits should, in general, be spent on disposable pictures since their quality does not benefit future pictures. Furthermore, B-coded pictures produce a smaller SAD than P-coded pictures on average. As a result, fewer bits may be allocated to them as well. In the disclosed rate control algorithm, the coding parameters used for such pictures can be a function of the coding parameters that were used to encode the pictures that are not disposable and belong to the highest priority level (e.g., "anchor" pictures). The latter coding parameters can be referred to as the base coding parameters. In some embodiments, the set of coding parameters can include only the QP value, where the base QP value can be expressed as baseQP=max (QP$_{L0(i)}$,QP$_{L1(i)}$). The modifier that changes the base QP value of pictures in a hierarchical structure is referred to as B$_{offset,i}$, as indicated in the previous sections of this disclosure.

The modifier of the coding parameters can be determined as a function of many factors, some of which are listed and described below.

(a). The hierarchical level to which the picture belongs, which also can be affected by the temporal prediction distance.

(b). The prediction type (intra, predictive, bi-predictive, and the like).

(c). The use of the picture as a prediction reference for other pictures.

(d). The base coding parameters.

(e). The scene type: scene change, fade-in, fade-out, cross-fade, flash, and the like.

(f). Complexity measures (mainly temporal) for the current picture.

In some implementations, the effect of the above factors to the derivation of B$_{offset,i}$ could be linear (additive) and in another it could be multiplicative. For example, it could be multiplicative perhaps in some other domain (quantization step), which could be then translated to the quantization parameter (QP) domain. In the linear model, the B$_{offset,i}$ is expressed as follows:

$$B_{offset,i} = B_i^{level} + B_i^{slice} + B_i^{ref} + B_i^{baseQP} + B_i^{scene} + B_i^{cmplx}$$

The coding parameters for the coded picture can be affected by each factor. The effect of each of the factors below can be combined with the rest of the factors, as well as the bit rate and buffering constraints to yield the final coding parameters for the picture.

Factor (a)

When all pictures in the hierarchical structure have the same priority level (e.g., their decoding can depend only on anchor pictures), then similar coding parameters can be used to code them. For example, parameters could be adjusted slightly compared to a baseQP depending on the spatial complexity of the frame, or where they are located in the hierarchical structure. The coding parameters can be selected so that fewer bits are allocated than when the base coding parameters are used. In some embodiments, the factor can be expressed as:

$$B_i^{level}=c,$$

where c is a variable that can be set equal to 2 in some implementations.

Otherwise, if the pictures of the hierarchical structure have varying priorities (e.g., certain pictures in the hierarchical structure may not be decoded unless other pictures in the same hierarchical structure are decoded first), then the pictures can be coded with coding parameters that yield better quality than pictures belonging to a lower priority level and worse quality than pictures belonging to a higher priority level. In some embodiments, the factor can be derived as:

$$B_i^{level}=\text{current\_level}_i.$$

Factor (b)

The slice type can affect the selection of the coding parameters. Given that a picture can be coded as an I-coded, P-coded, or B-coded picture, or some other type of prediction, the following constraints can be imposed: intra-coded pictures can employ coding parameters that allocate a different number of bits than those used for predictive coded pictures; and predictive coded pictures can use coding parameters that can allocate a different number of bits than those used for bi-predictive coded pictures. In some embodiments, the modifier for the base QP can take the following values:

$$B_i^{slice} = \begin{cases} -s_I, & \text{intra} \\ -s_P, & \text{predictive} \\ 0, & \text{bi-predictive} \end{cases},$$

where $s_I$ and $s_P$ are variables, both are non-negative, and, in some embodiments, are constrained as $s_I \rightarrow s_P$.

Factor (c)

When a picture is being used as a reference then it can be important to code that picture at a higher quality than pictures that will not serve as prediction references and will not be disposed. When all pictures in the hierarchical structure have the same priority level (e.g., their decoding depends only on anchor pictures), the reference pictures can use coding parameters that yield better quality compared to the coding parameters used for non-reference pictures. In some embodiments, the factor can be expressed as follows:

$$B_i^{ref} = \begin{cases} -c, & \text{reference} \\ 0, & \text{otherwise} \end{cases},$$

where c is a non-negative variable that can be set to 1.

Otherwise, if the pictures of the hierarchical structure have varying priorities (e.g., certain pictures in the hierarchical structure may not be decoded unless other pictures in the same hierarchical structure are decoded first), then the coding parameters can be adjusted as described in the paragraph above, or can remain the same. Hence, in some embodiments, the factor is set to zero:

$$B_i^{ref}=0$$

Optionally, there may also be a consideration of not only whether the current picture will be used as a reference, but also which references it is going to use for motion compensated prediction. A picture that is directly predicted from, in general, higher quality anchor pictures that are close in display order can be coded with fewer bits through the selection of the appropriate coding parameters when compared to a picture that is predicted by lower quality pictures that are farther apart in display order. This consideration may not only be a function of the level, but also can be a function of the position.

For example, in FIG. 4 consider pictures 2 and 4, which belong to the same level. In some embodiments, picture 2 can have access to higher quality references when compared to picture 4 even though they belong to the same hierarchical level. In some other embodiments, the complexity of these pictures could also be considered and a greater or smaller number of bits, and subsequently quality, could be given to pictures that may affect subjective or objective quality more or less prominently, respectively.

Factor (d)

If the base coding parameters yield good quality, then the coding parameters for the hierarchical pictures can be somewhat degraded since the drop in quality will not be noticeable. If, however, the base coding parameters yield low quality, then the degradation should be negligible, if any. In some embodiments, this modifier can be a function that is decreasing with the value of the baseQP parameter. It could either be linear, non-linear, exponential, Gaussian, quadratic, or of some other form. One possible derivation for this parameter can include the following:

$$B_i^{baseQP} = \begin{cases} 3, & baseQP \leq 15 \\ 2, & 15 < baseQP \leq 19 \\ 1, & 19 < baseQP \leq 24 \\ 0, & baseQP > 24 \end{cases}.$$

Factor (e)

The scene type can be important in determining the coding parameters for a picture in a hierarchical structure. Even though it may not be desirable in some coding arrangements, it is possible to code a scene change within the hierarchical structure. Even though one of the two anchor pictures can, in high likelihood, contain one of the first pictures of the new scene, it can be important to avoid poor visual performance due to uneven quality. The uneven quality can occur in some circumstances since it is possible that the first few pictures of the new scene will be of lower quality than the one that was coded as an anchor picture. To avoid this subjective quality issue, the quality of pictures that belong to the new scene should be increased. In some embodiments, this may be accomplished by setting $B_i^{scene}=-c_1$, where c) is a non-negative variable.

If the picture belongs to a fade and weighted prediction is used, then the coding parameters should be adjusted so that fewer bits are spent. In some embodiments, the factor should be set to zero, e.g., $B_i^{scene}=0$.

When flashes are coded, fewer bits can be spent since it can rarely be noticeable. In some embodiments this may be accomplished as $B_i^{scene}=c_2$, where $c_2$ is a non-negative variable.

In some implementations, the variables described above in factors (a) through (e) above can also depend on a variety of other factors, such as the buffering constraints at the encoder and the decoder, the average, minimum, and maximum bit rate constraints, the base QP used, and the sequence statistics, among others.

The complexity measures of the pictures can primarily be used to derive the coding parameters (e.g., QP) of the anchor pictures, of which baseQP is a function. However, there can also be nontrivial complexity fluctuations within pictures in the hierarchical structure, which can warrant varying the coding parameters according to the complexity of the current picture. If a picture is too complex, then the coding parameters should be adjusted so that not many bits are wasted.

As discussed above, the picture complexity can be estimated and then used to modulate coding parameters, such as the QP. This discussion relates to the anchor pictures. While it is perfectly possible to employ the complexity of the anchor pictures to modify the coding parameters used to code the pictures in the hierarchical structure, this can be sub-optimal in some cases. A better solution in such cases can involve using the temporal complexity (e.g., SAD) of the picture in question (e.g., picture i) with respect to the reference picture or pictures that will be used to encode it.

For example, in a hierarchical coding structure IBBBP with coding order I0-P4-B2-B1-B3, picture 0 will be an intra-coded picture and picture 4 will be coded as a P-coded picture. Next, picture 2 is coded as B-coded picture that is retained as a reference. Finally, pictures 1 and 3 are coded as disposable B-coded pictures. The complexity estimate for picture 4 (e.g., the "anchor" picture) that is predicted from picture 0 can be different compared to the complexity estimate for picture 1, which is predicted from pictures 0 and 2. If the available SAD prediction error involves only uni-predictive motion estimation, then the complexity estimate for picture 1 can be modeled as: $c_{1,temporal}=\min(SAD_1(0),SAD_1(2))$. In general, the temporal complexity of bi-predictive pictures inside the hierarchical structure can be expressed as $c_{i,temporal}=\min(SAD_i(R0(i)),SAD_i(R1(i)))$. Terms $R0(i)$ and $R1(i)$ are the indices of the two references that are used for the bi-prediction of picture i. If there is access to bi-predictive SAD statistics, they should be used in place of the above determination.

In other embodiments, if the available SAD prediction error involves only uni-predictive motion estimation, then a more accurate estimate of the bi-predictive SAD can be obtained by applying the minimization at the block level. In an example, B can denote the total number of blocks in a picture, and SAD), (n) can denote the uni-predictive SAD error for the prediction of block b in picture m from some block in picture n. The complexity estimate can be the sum, over all blocks in the picture, of the minimum value of block-based SAD from each of the two references. This complexity estimate can be expressed as:

$$c_{i,temporal} = \sum_{b=1}^{B}\min(SAD_i^b(R0(i)), SAD_i^b(R1(i))).$$

The coding parameter modification rule can be based on the following premise: if the complexity of the picture in the hierarchical structure exceeds a fraction of the complexity of the anchor picture or some threshold derived from the complexity of the anchor picture, then the coding parameters should be modified to reduce the bit usage. One possible embodiment for this algorithm can have the following expression:

$$B_i^{cmplx} = \text{Clip3}\left(0, Q, \frac{c_{i,temporal}}{\delta \times c_{(i,LIST\_1),temporal}}\right),$$

where $\delta$ is a floating point number that is greater than zero, and may take values below one. The threshold Q can take positive values and can be set to a small integer value, e.g., 2.

Even though the term picture was referred to above as the smallest coding unit, all algorithms and embodiments presented in this disclosure are also applicable to field/interlaced coding, the use of multiple slices per picture, and blocks or block regions. This method can also account for arbitrary region-based coding.

Spatial Coding Parameter Adaptation

The previous discussion for the coding parameter allocation for hierarchical prediction structures tends to relate to the selection of the coding parameters that are used to code a picture. To further improve compression performance, the coding parameters can be varied on a macroblock basis to account for variations in spatial statistics. Similar to the disclosure above on the section for complexity estimation, the coding parameters for the macroblock (e.g., a block of 16×16 pixels) can be modulated using some macroblock complexity measure, which again is a function of several types of complexities. In modern video codecs, such as H.264/AVC, the coding parameters can be adjusted down to a granularity of 4×4-pixel blocks. The function of these types of complexities can be additive or multiplicative, and the higher the value of this function, the more compression artifacts can be masked.

In an example, m and n can denote the horizontal and vertical coordinates of a macroblock in the picture, respectively. Also, M and N can denote the horizontal and vertical length of the picture as measured with macroblock units, respectively. The following measures are parameters of the function, where the parameters include the spatial variance $c_{var}$, the edge information $c_{edge}$, the texture information $c_{texture}$, the luminance information $c_{lum}$, and the temporal complexity information $c_{temporal}$.

(a) Spatial Variance $c_{var}$

This complexity measure can be some form of spatial variance determination on a macroblock basis. First, the average value of the luminance and/or chrominance pixel values in the block can be determined. Second, the average value of the square of the difference between each individual pixel and the previously determined average value can be computed as the spatial variance. Alternatively, another measure that can capture the spatial variability can be used, such as the intra-block cross-correlation of the pixel values.

(b) Edge Information $c_{edge}$

Edge information can be gathered by applying an edge detection filter, such as the Sobel or Prewitt filters. The magnitude and orientation of the detected edge information can be an indication of the edge content in the macroblock. Similar information can be gathered by applying some spatial transform and evaluating the coefficients that represent certain horizontal and vertical frequencies.

(c) Texture Information $c_{texture}$

Texture information can be gathered through various methods such as summing the squared values of certain transform coefficients that represent certain spatial frequencies. Suitable transforms for this application can include the discrete cosine transform, the discrete wavelet transform, and the band-let and edge-let transforms, among others.

(d) Luminance Information $c_{lum}$

This parameter can represent the average luminance and/or chrominance value for the macroblock.

(e) Temporal Complexity Information $c_{temporal}$

This temporal complexity can mirror the estimation and filtering of the temporal complexity for the picture level, as discussed above. This temporal complexity can also be a function of the motion vector magnitude. The difference is that the values, e.g. SADs, are the values for individual blocks or macroblocks. One of the reasons for using this kind of complexity is that if certain blocks are characterized by more significant motion than others in the same picture, then they can be coded at lower quality since motion will mask compression artifacts.

From the parameters (a)-(e) above, the final spatial complexity for each block can be expressed as follows:

$$c_{spatial}(m,n)=f(c_{var}(m, n), c_{edge}(m, n), c_{texture}(m,n), c_{lum}(m,n), c_{temporal}(m,n)).$$

In some embodiments, a first expression of the QP modifier used to encode each block can be written as:

$$QP_{mod}(m, n) = \text{Clip3}\left(-d, d, \frac{\alpha \times c_{spatial}(m, n) - \frac{\gamma}{M \times N}\sum_{i=1}^{M}\sum_{j=1}^{N}c_{spatial}(i, j)}{\frac{\beta}{M \times N}\sum_{i=1}^{M}\sum_{j=1}^{N}c_{spatial}(i, j)} - b\right).$$

Parameters d and b can be used to constrain and center the QP offset, while parameters $\alpha$, $\beta$, and $\gamma$ can be selected after simulations. Parameters b and d can be set to 1 and 2 in one possible embodiment. The selected QPs then can be filtered to reduce large variations of the QP among neighboring blocks. For instance, the QP values of blocks that are different from all neighbors can be set to the average value of the neighbors. This filtering operation yields $QP_{mod,f}(m, n)$. The final QP used to code the block can be offset to ensure that the average QP value for the entire picture will be equal to the QP selected by the rate allocation/control for the current picture QP:

$$QP(m, n) = QP + QP_{mod,f}(m, n) - \frac{1}{M \times N}\sum_{i=1}^{M}\sum_{j=1}^{N}QP_{mod,f}(i, j).$$

The QP can be further modified so that encoder and decoder buffer constraints are satisfied. If the encoder predicts that a buffer overflow or underflow is imminent, then the encoder can increase or decrease the QP accordingly so that the constraints are satisfied. The same can be true for achieving the target bit rate. If bits are overspent, then, given coding statistics from previous pictures, the encoder can allocate fewer bits for certain regions or blocks by increasing their QP values. Similarly, the QP values of certain blocks can be decreased if not enough bits were utilized.

In some implementations, the parameter allocation can be a function of determining where the pictures are located (e.g., their current level and their position in time). Level 0 can represent the highest priority level. In particular, level 0 can have pictures that can be decoded once already encoded pictures within the same level have been decoded first. These pictures can have better quality than pictures in other lower levels.

The QP or rate allocation also can depend on the slice type or prediction type with reference to other pictures within the same block or other blocks. Another factor can include whether pictures can be used to predict other pictures. For example, some pictures can be discarded and will not contribute much to the quality or bit rate.

Figure 17:
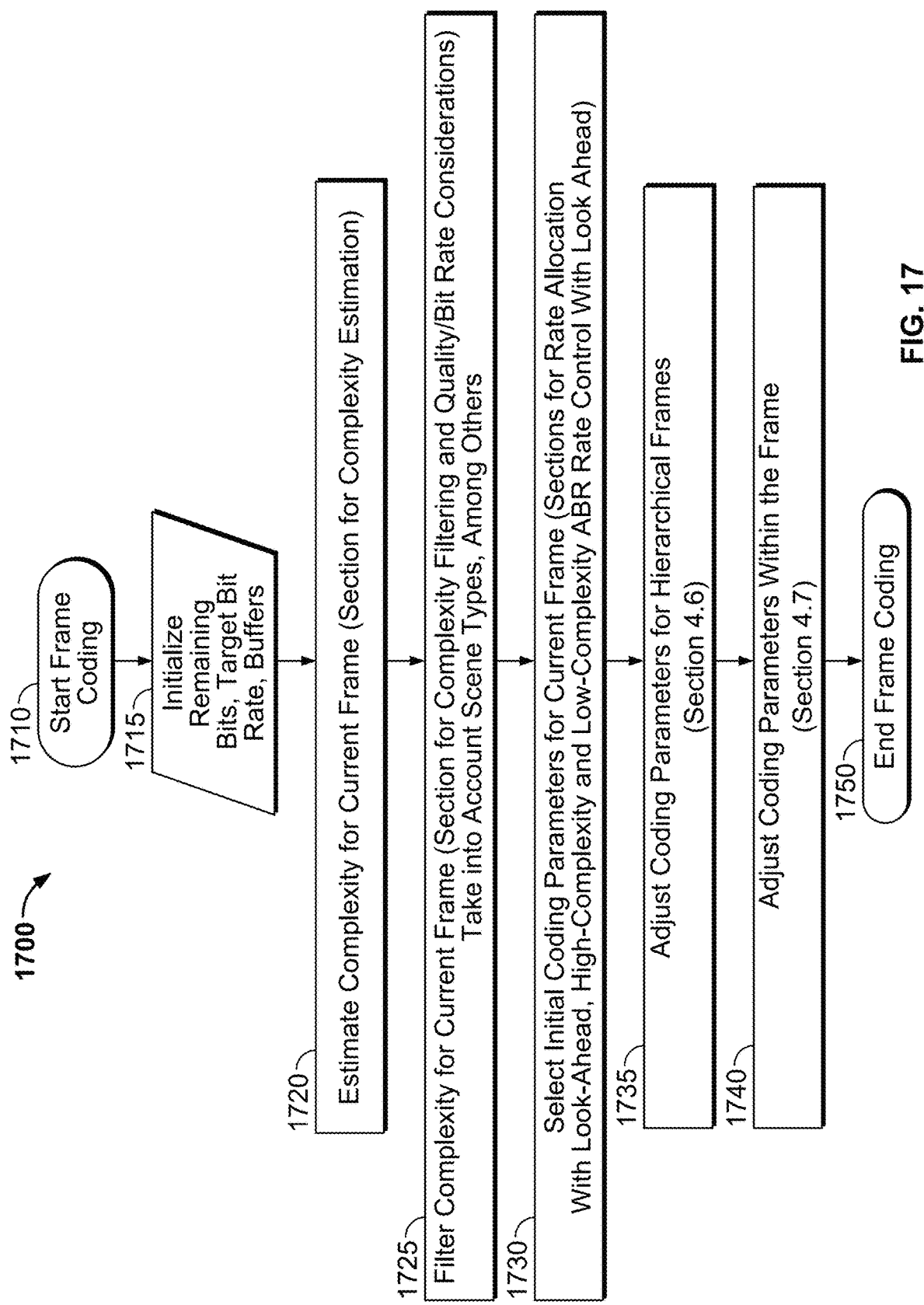
FIG. 17 depicts a diagram of an example of some of the various steps of a proposed rate control algorithm.

FIG. 17 shows an example diagram of some of the various steps of a proposed rate control algorithm. The frame coding starts 1710 and initialization is performed 1715 on the remaining bits, the target bit rate, and the buffers. The complexity estimate is determined 1720 for the current frame, as described in the section for complexity estimation above. The filter complexity is determined 1725 for the current frame, as disclosed in the sections for complexity filtering and quality/bit rate considerations. This determination 1725 takes into account scene types, and other considerations. The initial coding parameters are selected 1730 for the current frame, as disclosed and taught in the above sections for rate allocation with look-ahead, and/or the high-complexity and low-complexity single pass rate control with look ahead. The coding parameters for the hierarchical frames are adjusted 1735, as disclosed and taught above in the section for coding parameter allocation for hierarchical prediction structures. Then the coding parameters are adjusted 1740 within the frame, as disclosed in the above section for spatial coding parameter allocation. Then the frame coding is terminated 1750. Other flow diagrams or implementations can differ from the order, steps, and/or types of steps that are shown in FIG. 17.

Example Systems

Figure 18:
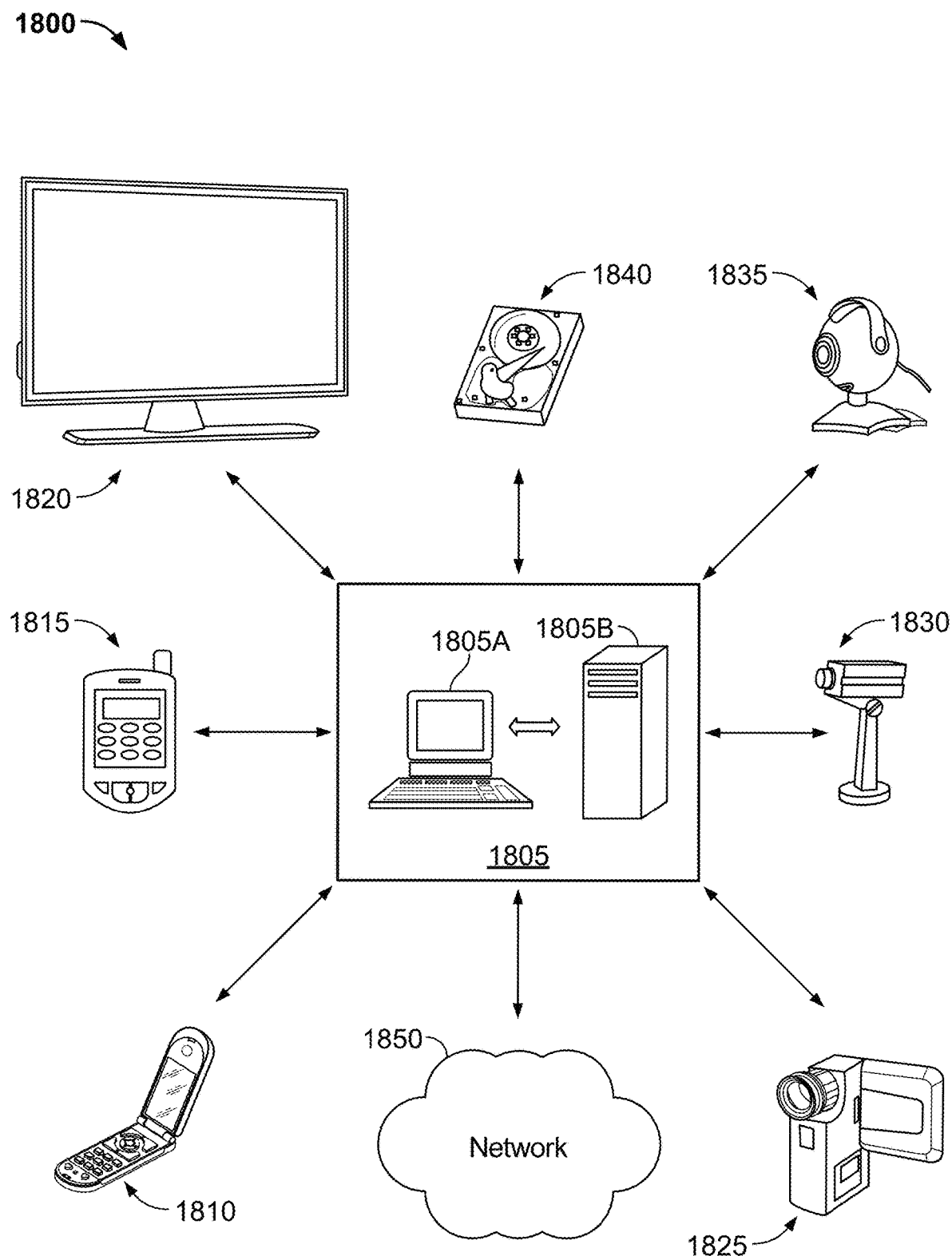
FIG. 18 depicts an example of a system.

FIG. 18 depicts an example of a system that can employ any (or any combination) of the techniques described herein. The techniques can be used on one or more computers 1805A, 1805B. One or more methods (e.g., algorithms/processes) herein can be implemented with, or employed in computers and/or video display 1820, transmission, processing, and playback systems. The computers described herein may be any kind of computer, either general purpose, or some specific purpose computer such as a workstation. The computer 1805B may be, e.g., an Intel or AMD based computer, running Windows XP™, Vista™, or Linux™, or may be a Macintosh computer. An embodiment may relate to, e.g., a handheld computer, such as a PDA 1815, cell phone 1815, or laptop 1805A. The computer may also refer to machines or parts of a machine for image recording or reception 1825, 1830, 1835, processing, storage 1840, and distribution of data, in particular video data.

Any combination of the embodiments described herein may be part of a video system and its components. Any combination of the embodiments may be part of a video encoder, as in the example video encoder of FIG. 1 and/or other components. Any combination of the embodiments may be implemented in hardware and/or software. For example, any of the embodiments may be implemented with a computer program.

Computer and/or graphic programs may be written in C or Python, or Java, Brew or any other programming language. The programs may be resident on a storage medium, e.g., magnetic or optical, e.g., the computer hard drive, a removable disk or media such as a memory stick or SD media, wired or wireless network based or Bluetooth-based (or other) Network Attached Storage (NAS), or other fixed or removable medium. The programs may also be run over a network 1850, for example, with a server or other machine sending communications to the local machine, which allows the local machine to carry out the operations described herein. The network may include a storage area network (SAN).

Although only a few embodiments have been described in detail above, other embodiments are possible. It should be appreciated that embodiments of the present invention may encompass equivalents and substitutes for one or more of the example techniques described herein. The present specification describes specific examples to accomplish a more general goal in another way. This description should be understood to represent example embodiments and the claims following are intended to cover any equivalent, modification, or alternative.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a computer readable medium for execution by, or to control the operation of, data processing apparatus. The computer readable medium can be a machine-readable storage device 1840, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and depicted in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or another programmable logic device (PLD) such as a microcontroller, or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, some embodiments of the subject matter described in this specification can be implemented on a computer having a display device, e.g., a CRT (cathode ray tube), LCD (liquid crystal display), or plasma display monitor 1820, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software or hardware product or packaged into multiple software or hardware products.

In some implementations, a system utilizing one or more of the methods/algorithms can include a video encoder, an optional motion-estimation and compensation pre-analyzer, optional spatial statistics analysis modules, one or multiple rate control modules that select the coding parameters, multiple statistics modules that gathers useful statistics from the encoding process, an optional statistics module that gathers statistics from the motion-estimation and compensation pre-analyzer, including decision modules that can fuse statistics from the optional MEMC pre-analyzer, and/or the video encoder, controller of the rate allocation, various control modules, and/or a transcoder.

Motion estimation could utilize any algorithm, including block based and region based motion estimation, phase correlation, pel-recursive techniques, and the like, and a variety of motion models can be used including translational, affine, parametric, and others. Thus, particular embodiments/implementations of the disclosure have been described. Other embodiments are within the scope of the following claims.

What is claimed is:

1. An apparatus for decoding a bitstream, comprising:
   at least one processor; and
   at least one computer-readable medium storing instructions executable by the at least one processor to perform operations comprising:
      receiving the bitstream, wherein the bitstream includes image frames associated with at least a first temporal scalability level and a second temporal scalability level,
      wherein the image frames of the second temporal scalability level are not used as a reference for motion-compensated prediction of the image frames of the first temporal scalability level,
      wherein at least one frame of the second temporal scalability level is signaled in the bitstream by an encoder as a disposable frame, and at least one frame of the second temporal scalability level is signaled in the bitstream by the encoder as a non-disposable frame, and
      wherein the second temporal scalability level comprises at least one frame that is an I-coded picture, and at least one frame that is not an I-coded picture;
      discarding, based on signaling in the bitstream and without decoding, all frames of the second temporal scalability level, including the at least one frame that is signaled in the bitstream by the encoder as a disposable frame, and the at least one frame that is signaled in the bitstream by the encoder as a non-disposable frame; and
      decoding frames of the first temporal scalability level.

2. The apparatus of claim 1 wherein the at least one frame of the second temporal scalability level that is signaled in the bitstream as a non-disposable frame is used as a reference for motion-compensated prediction.

3. The apparatus of claim 2 wherein the reference is for an image frame of a third temporal scalability level.

* * * * *